United States Patent [19]
Cupler, II

[15] 3,681,829
[45] Aug. 8, 1972

[54] TOOL CHANGER EMPLOYING AUTOMATIC WORK INDEXING MECHANISM

[72] Inventor: John A. Cupler, II, 10 Cupler Drive, Cumberland, Md.

[22] Filed: Sept. 4, 1969

[21] Appl. No.: 871,135

Related U.S. Application Data

[62] Division of Ser. No. 715,711, March 25, 1968, Pat. No. 3,478,419.

[52] U.S. Cl. ........................... 29/26 A, 27/568, 408/4
[51] Int. Cl. ............................................. B23q 3/157
[58] Field of Search ....................... 29/568, 26; 408/4

[56] References Cited

UNITED STATES PATENTS 3,259,957  7/1966  Stobbe ........................... 29/26
3,238,615  3/1966  Leone et al. .................. 29/568

Primary Examiner—Andrew R. Juhasz
Assistant Examiner—Z. R. Bilinsky
Attorney—Colton and Stone

[57] ABSTRACT

The disclosure introduces a new concept in machining; that of the non-captive tool. A non-captive tool is herein defined as one which may undergo bodily movement, transversely of its own axis, relative to both the tool bearing structure which supports the tool in working position and a tool support structure which supports the tool in a non-working position adjacent the bearing structure. The non-captive tool is unrestrained against the aforesaid bodily movement except during that time the tool is actually working and, while working, the restraint imposed is due to engagement with the tool driving means. Accordingly, removal of the tool driving means from engagement with the tool frees the same for bodily movement which movement may, advantageously, be integrated with the movement of the tool driving means out of engagement with the tool.

4 Claims, 24 Drawing Figures

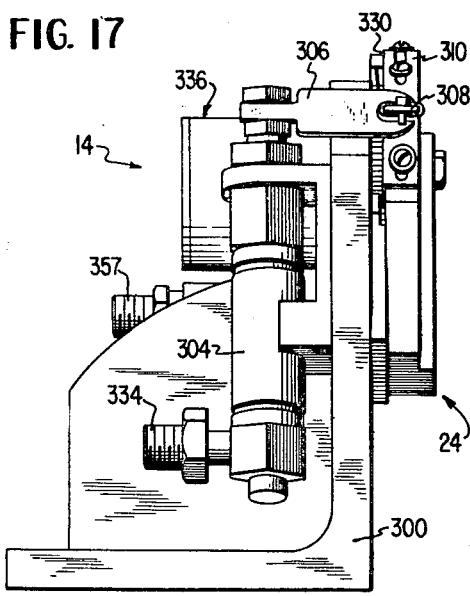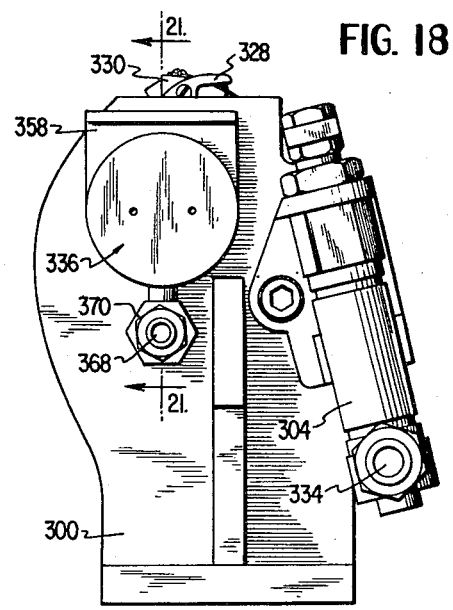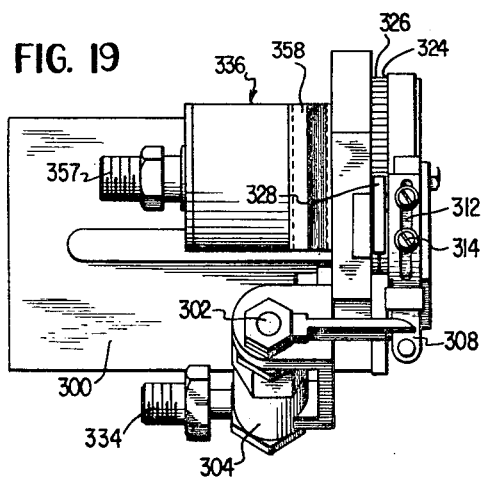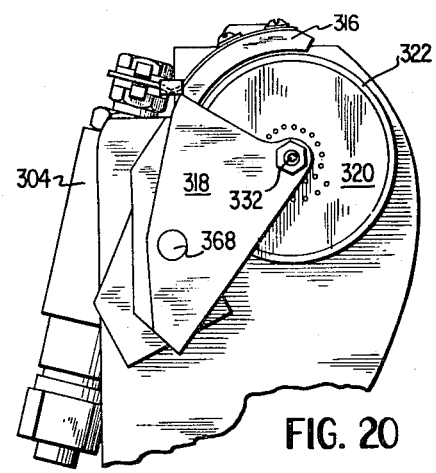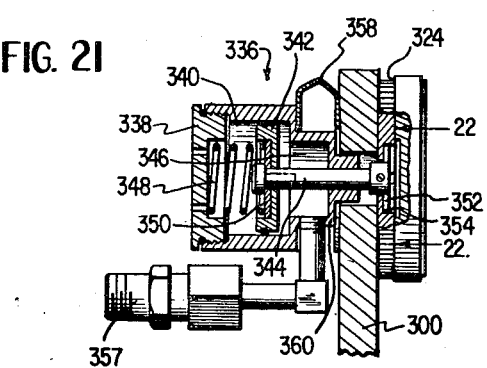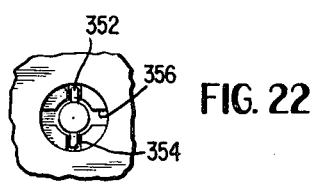

TOOL CHANGER EMPLOYING AUTOMATIC WORK INDEXING MECHANISM

This is a division of application Ser. No. 715,711, filed Mar. 25, 1968, now U.S. Pat. No. 3,478,419.

The disclosure is directed to methods and apparatus for automatically interchanging a plurality of non-captive rotary tools between working and non-working positions; for effecting tool interchange concomitantly with respective engagement and disengagement of working and non-working with a constantly driven input; for effecting infinitely variable infeed of the working tools; for automatically positioning a workpiece in accordance with pre-programmed operating cycles controlling a tool changer; for performing machining operations with a tool having a compound rotary input; and for transmitting a programmed cycle of operation from a master machining console to a plurality of slave machining centers.

The working and non-working tools in accordance with a first aspect of the invention relating to a tool changer are non-captively supported, in a horizontal position, on Vee bearings and a tool support rack, respectively. The tools are mounted on spindles which are adapted to be supported adjacent their outer ends on the support rack and at an intermediate portion thereof on the bearings. The bearings are of the Vee type and provide non-captive support for the tool spindles supported thereon to permit both rotary and reciprocating movement of the tools. Relative vertical movement between the rack and bearings results in an interchange of tools therebetween by virtue of the tools being lifted from either the bearings or the rack, depending on the direction of vertical movement.

At least one flexible driving member is constantly recirculated adjacent the bearings and is mounted for vertical movement with the tool support rack for movement into and out of driving engagement with the working tools simultaneously with the aforementioned tool interchanging operation.

A linearly reciprocable cam follower is mounted adjacent each tool bearing in coaxial alignment with that end of the tool spindle remote from the working end; whereby reciprocating and/or advancing movement of the followers will be transmitted through one end thereof to the working tools. An elongated cone cam is positioned to engage the other ends of the followers and reciprocate the same upon rotation of the cone. The cone is, additionally, mounted for axial translation to provide for controlled advance of the followers and tools engaged thereby. Simultaneous rotation and translation of the cone results in a constantly advancing reciprocating path of tool movement.

A work station is positioned adjacent each of the Vee bearings and includes a work clamping and indexing mechanism whose sequence of operation is integrated with, and controlled by, the operating cycles undergone by the tool changing mechanism.

A tool having a pair of telescoped spindles, each of which is adapted to receive a separate rotary input, is provided for use in certain special machining operations.

A second cone cam is mounted outside the confines of the tool changing mechanism for reciprocating one or a plurality of followers comprising the input to a closed hydraulic slave system whose output is adapted to actuate additional tools.

BACKGROUND OF THE INVENTION

The invention relates, primarily, to tool changers of the type wherein a plurality of rotary tools are required to perform sequential operations on a single workpiece or a plurality of workpieces. Exemplary of the type machining operations that may be performed on a single workpiece or a plurality of workpieces, in accordance with the invention, are drilling, boring, milling, grinding, reaming, etc. In its broader aspects, it is within the contemplation of the invention to apply the principles herein disclosed to rotary tools in general and, more specifically, to working tools wherein some combination of rotary and reciprocating movement is desirable. As will be apparent from the ensuing description, the principles herein disclosed are also applicable to the interchanging and reciprocation of non-rotary tools.

Prior art tool changers of the more complex type commonly referred to as "Machining Centers" as well as greatly simplified versions thereof, have been known and used for years in machining operations that require the sequential use of rotary tools to perform various operations on a single workpiece. These prior art structures have, through the years, advanced from the simplest hand operated models, through semi-automatically operated devices to highly sophisticated automated tape-controlled tool changers. As mass production techniques have advanced, machine tool designers have attempted to keep pace with increasing requirements of shorter time cycles in tool changing operations by a variety of methods that diverge from, or ignore, the primary obstacle to the attainment of a virtually instantaneous tool interchange. This obstacle is the captive tool. The use of chucked, or captive, tools characterized not only the earliest tool changers but those in present day use.

The necessity of stopping rotation of a chuck and spindle during a tool changing cycle with attendant decrease in production efficiency due to "down time" is normally regarded as axiomatic in the machine tool industry. Accordingly, prior efforts to reduce "down time" have been directed, primarily, to methods of shortening the cyclic time requirements in stopping rotation of the chuck, removing one tool from the chuck, substituting a second tool therefor and again engaging the chuck drive.

In addition to the conventional acceptance of a chucked tool as a necessary part of a tool changer, the indexing mechanism of the usual present day equipment holds the tools captive prior to the interchanging operation with a chuck. This makes it necessary to release the tools when it is desired to alter the sequence of operations that may be performed at the work station.

Another great disadvantage in known tool changers is the difficulty in some cases, and the impossibility in others, of obtaining perfect concentricity among the various tools that may be required to operate in a single position. This problem is greatly magnified in the case of miniature machining operations because even the minor eccentricities inherent in chucked tools, which may be tolerated in macro drilling, are multiplied beyond permissible tolerance ranges in the case of micro drilling or machining.

Inasmuch as chucked tools are intended to rotate concentrically with the axis of the rotating chuck, it is necessary to reposition the chuck any time it is desired to work on a new centerline or otherwise reposition the workpiece in relation to the chuck. This is not only time consuming, but allows for additional errors to be introduced in the repositioning step.

Known tool changers of the type to which the invention pertains normally utilize tool infeeding mechanisms which involve infeeding and/or reciprocation of the chuck and tool. Because of the fact that a tool will normally be advanced into the workpiece in a reciprocating manner to facilitate chip removal, the use of rotary cams having sequentially increasing cam follower lobes separated by cam flats have heretofore been regarded as one of the more desirable methods of infeeding and reciprocating tools. The greatest disadvantage in such a system of tool infeed is in the fact that, for a particular cam, the tool infeed program is established when the cam is installed and can only be varied by substituting a different cam. Thus, in the case of a tool changer where many different type operations are to be performed on a single workpiece; the various tools, each, require various rotational speeds, infeed rates and reciprocation cycles for maximum efficiency. This flexibility is virtually impossible to achieve in a tool changer using conventional camming arrangements wherein a plurality of tools are to perform a machining operation on a single workpiece after which time the same sequence of machining operations are to be performed at a different position on the same workpiece or on a separate workpiece. Accordingly, it is necessary to compromise the most efficient operating cycles for each of the particular tools in order to achieve a programmed control that is acceptable for all of the tools. The problem becomes more acute when changing over from machining one type material to another. In this case, it is usually necessary to substitute cams which is not only time consuming but requires the maintenance of a large number of precision cams which are quite expensive.

Another great disadvantage in conventional cam infeeding mechanisms is that the starting position of the tool infed thereby, is more or less fixed. Thus, for example, a tool actuated by a conventional cam infeed will always start at substantially the same point relative to the work station. This is disadvantageous where, for example, a new tool is intended to work within a previously formed bore or in a recess of indeterminate depth.

Among the many additional disadvantages in known cam infeed systems, in addition to the inability to change the infeed cycle that is built into the cam; are the inability to instantaneously change over from a reciprocating tool infeed to a non-reciprocating infeed, i.e., to separate the rises and falls built into a conventional cam; the inability to stop tool reciprocation either in or out of the hole; and the inability to infinitely control infeed rates.

A primary object of the invention is to provide a method of, and apparatus for, utilizing completely non-captive tools in a tool changer whereby the same may be interchanged for sequential operations virtually instantaneously.

The invention is further directed to a method and apparatus for interchanging a plurality of tools between working and non-working positions in which the rotary tool driving means is automatically engaged and disengaged with respect to appropriate ones of the tools as an incident of the tool changing operation. In the case of non-rotary tools, the rotary tool driving means may be engaged with the non-rotary tool and the drive thereto interrupted whereby the same merely holds the tool in position for the infeeding operations to be subsequently described.

An outstanding feature of the invention that is susceptible of use, not only with a tool changer involving a plurality of sequential operations but also with a single tool machining operation, is the method and apparatus relating to the tool infeeding mechanism herein disclosed. The tool infeed mechanism makes possible a method and apparatus whereby a plurality of sequentially operated tools may be infinitely and individually controlled in their infeeding operations that may include either reciprocating, reciprocating-advancing or straight advancing movement. The infeed mechanism thus makes it possible to separate the rises and falls inherently built into conventional cam infeeding mechanisms whereby, for the first time, a plurality of tools may be infinitely controlled by a single camming member which, in turn, may simultaneously control the operation of virtually any number of tools.

It is among the further objects of the invention to provide method and apparatus for non-captively supporting a plurality of tools adjacent a tool bearing adapted for non-captive tool support and interchanging tools therebetween; to enable the sequence of tool operation to be altered in any desired manner either under manual or automatic programming; to dispense with the necessity of stopping tool rotation prior to the initiation of a tool changing operation; to provide a tool changer wherein perfect concentricity among the various tools in the working position is assured, merely by controlling the diameter of the tool spindles; to provide a tool changer that is equally adaptable for precision machining in either macro or micro operations; to provide a novel cam infeeding arrangement requiring but a single cam to control the infeed of any desired number of tools; to provide a work station having means for cyclically indexing and clamping a workpiece in accordance with input signals derived from the tool interchange mechanism; and to provide method and apparatus for transmitting, not only programmed information but the work output derived therefrom, to a plurality of remotely located working stations.

The fact that the tool infeeding mechanism may be infinitely varied coupled with the fact that the rotational velocity of the tools may be infinitely controlled, permits the most desirable operating parameters for each particular tool to be pre-programmed into the machine.

SUMMARY OF THE INVENTION

The invention is directed, primarily, to a tool changer which may be either semi-automatically controlled or completely automated under tape-controlled or digital programming.

The contrast between actual performances of the tool changer herein described and known tool changers, as regards overall speed of operation and accuracy of control, is such as to render present day tool changer principles obsolete.

The word "tool," as used herein, refers not only to the actual tool itself, such as a drill, but also to the spindle on which the same is carried. It will be apparent that the working tool portion, itself, could be formed separately and mounted on the spindle or formed integrally therewith.

The tool changer, according to the invention, is provided with a plurality of horizontally arranged upwardly opening Vee bearings that are fixedly positioned adjacent their respective work stations for non-captively supporting a spindle mounted tool on each of the bearings for combined rotary and reciprocating motion relative thereto. The fact that the tool bearing is fixed, relative to the work station, eliminates the introduction of any error in positioning a new tool in coaxial alignment with the working position of a previous tool based on the tool support bearing itself. Thus, if the tool spindle diameters of a plurality of tools are equal, their sequential placement in the same Vee bearing insures their positioning along the same axis as contrasted to the case of chucked tools wherein not only the tools but also either their chucks or the workpiece are moved relative to the work during each tool changing cycle.

A particularly desirable type machining operation requiring extreme accuracy of positioning that is virtually impossible to achieve without utilizing the principles herein disclosed, is the machining of a single hole having varying diameters relative to a common centerline. Thus, in making a synthetic yarn spinnerette, for example, where a countersink bore of relatively large diameter is to extend part way through the workpiece and the bore is to be continued through the workpiece with a much smaller bore; it is critical that the smaller bore be precisely on centerline with the larger bore to insure that the intersection of the two bores occurs in precise symmetrical relationship to the deepest penetration of the countersink portion of the larger bore.

Additionally, in order to change the work centerline it is not necessary to substitute a tool having a spindle whose diameter differs from that of a previous tool by a known amount. Accordingly, the necessity for repositioning a chuck or a workpiece during a working cycle is eliminated along with the errors inherent in such a repositioning operation. The spindles themselves, having been previously machined to known diameters within known tolerances, thus provide a most attractive and expeditious manner of changing working centerlines in an accurate manner merely by manually or automatically substituting one tool for another.

The Vee bearings support the tool spindles adjacent an intermediate portion thereof and the outer ends of the tool spindles extend beyond the longitudinal confines of the bearings. The function of this relationship of parts is two-fold; first, each tool spindle extends far enough beyond the ends of the bearing, axially of the spindle, to permit axial reciprocation of the tool spindle relative to the bearing and; secondly, the unsupported ends of the spindle may be engaged by a support rack moving upwardly, relative to the bearing, to lift the tool from the bearing. Conversely, downward movement of the support rack relative to the bearing results in a tool being lifted from the rack by the bearing whereupon such tool is positioned coaxially with the position of the tool previously supported on the bearing.

The bearing support rack, previously referred to, comprises a generally rectangular frame having the longer sides thereof spaced apart a distance slightly exceeding the length of the Vee bearings. A plurality of upwardly opening recesses are formed in the upper surfaces of the support rack in paired alignment along the respective longer sides thereof. The tool spindles bridge the longer sides of the support rack by having their end portions supported in the paired recesses. The support rack is mounted for both vertical and horizontal movement relative to the bearings. Various pairs of recesses in the rack may be aligned with various ones of the bearings by horizontal movement of the support rack whereupon vertical telescoping movement of the support rack relative to the bearings either lifts a tool from each of the bearings or deposits a tool thereon depending upon the direction of vertical movement. Considering the tools to be in working position on the bearings, when a tool change is to be effected; the support rack is vertically raised past the bearings to engage the outer ends of the tool spindles in the rack recesses and lift the tools from the bearings. After the support rack reaches its uppermost position above the bearings, the same is shifted horizontally to bring a new tool into alignment with each of the bearings. The support rack is then again lowered and the new tools are lifted from the rack by their engagement, adjacent the intermediate portions of the spindles with the bearings, as the rack is again lowered.

A constantly recirculating flexible driving member is mounted for bodily vertical movement with the support rack relative to the bearings. The driving member is so related to a plurality of idler pulleys and driving pulleys secured to each of the tool spindles that the same is brought into approximately 180° driving engagement with the driving pulleys of those tools positioned in the bearings when the support rack is in the lower position. Conversely, the flexible driving member is spaced from the tool driving pulleys when the rack is in the upper position. Thus, in a tool changing operation, the upward movement of the rack effects both a separation of the working tools from driving engagement with the recirculating member and removal of the tools from the bearings. This action is immediately followed by a horizontal shift of the tool support rack to bring other tools into vertical alignment with the bearings after which time the rack is again lowered to position new tools in the bearings and entrain the driving member at least part way around their driving pulleys. Thus, it is apparent that the drive for the recirculating driving member need not be interrupted during the tool changing cycle. Accordingly, it will be appreciated that the non-captive manner of supporting the tools, both on the bearings and on the tool support rack, taken in conjunction with the arrangement of parts wherein the driving member may be constantly driven makes it possible to reduce the time requirements involved in changing tools to that involved in moving the rack upwardly, horizontally and downwardly a matter of a few inches. The actual time requirement for simultaneously changing a plurality of tools adjacent a like plurality of work stations may vary between 0.5 seconds and 3 seconds depending on the size tools being utilized.

The advantages in non-captively supporting the tools on their respective bearings are immediately obvious in that the same may be both rotated and reciprocated in relation to a fixed bearing. This assures perfect tool alignment at all times as contrasted with previously known tool changers wherein the tool supporting elements, i.e., the chucks, must not only reciprocate with the tool but must be repositioned during the tool changing operation which introduces errors in addition to those inherent in chucks which cannot provide infinite concentricity as among a plurality of rotating tools held in the same chuck.

The advantages in the non-captive manner of supporting the tools on the tool rack are apparent, in part, in that such is required to effect the very rapid tool interchange described above. A less obvious, but no less important, advantage lies in the fact that an operator may substitute new tools for those already on the rack merely by lifting the same from the rack and putting others in their place. This substitution can be made while the working tools are engaging the workpiece. Assume, for example, a tool changer having four work stations, four Vee bearings and a tool support rack having 12 pairs of aligned tool supporting recesses. In this case, three separate tools are designed to be supported at different times on each bearing for engagement with the workpiece. In the event that it may be desirable to use a fourth tool in connection with a particular operation being performed, the operator may merely substitute such a tool for one of the three tools that has already performed its work operation. Alternatively, in a particular case, it may be desirable to substitute a different tool for one of the three tools that would normally engage the workpiece. The ability to quickly substitute new tools for those already on the rack is very important where, as in the present case, a plurality of workpieces are undergoing simultaneous operations. Thus, if an operator were required to use a chuck key or equivalent tool support releasing device to remove and insert every tool, the number of tools that could be changed within a reasonable period of time would be severely restricted and, of course, completely inconsistent with the speed of operation made possible by the tool changer of the present invention.

A unique tool infeeding mechanism is described herein which relies on a single camming member to control the infeed of virtually any number of rotary tools. A cam follower is mounted adjacent each bearing for reciprocal movement in coaxial alignment with the tool adapted to be supported on the bearing for rotation in the manner previously described. The positioning of the followers relative to the bearings and the lengths of the tool spindles are such that when the followers are urged to their forwardmost positions in the direction of the work stations, the forward ends of the followers engage the rearward ends of the tool spindles and move the same forwardly to their forwardmost positions representing the maximum tool penetration into the workpiece. The permissible rearward travel of the followers allows the spindle mounted tools to be completely withdrawn from the workpiece. The novel infeeding mechanism herein described relates to the manner in which a single camming member is utilized to actuate the followers and tools to undergo any desired sequence or combination of reciprocating, advancing-reciprocating and constant advancing motion. The use of a cone cam to engage the rear ends of the followers makes possible the range of infeeding operations herein described.

The cone cam includes an elongated conical surface interrupted by an elongated discontinuity or "cam flat" which actually may assume a slightly concave configuration when viewed in elevation. The cone is mounted for both rotation about its axis and bodily translation along its axis. The rotation may occur alone, to impart reciprocating motion to the tool, or the cone may be simultaneously rotated and translated to concomitantly reciprocate and advance the tool, i.e., advance the path of reciprocating motion. Alternatively, the cone cam may be translated without rotation whereupon the tools are advanced into the workpiece without reciprocation. All of the foregoing infeeding operations occur simultaneously with the tool rotation imparted thereto by the recirculating driving member in the manner previously explained. In those cases where it may be desirable to provide a virtually infinite infeed capability as between each of the working tools; a plurality of small cone cams, each having a different profile, may be mounted on the same shaft to coact with a different one of the working tools.

Tool reciprocation is normally desired, during the infeeding operation, in order to provide a period of time during which the tool may be cooled and chips removed from the workpiece by the flow of coolant onto the working area. A plurality of shallow grooves may be formed in the conical cam surface, if desired, to impart a series of very short reciprocating strokes to the tools during each rotation of the cam to facilitate chip breakage in addition to the much greater reciprocating stroke that occurs once during each cam revolution. This chip breaking reciprocation of the tools is an alternative feature of the invention and the reciprocation of the tool, in this case, normally occurs within the workpiece as contrasted to the larger stroke reciprocation occuring once during each cam revolution wherein the tools are withdrawn from the workpiece for chip removal.

Each of the cam followers, corresponding in number to the Vee bearings, may be of different lengths so that their cone cam engaging ends are spaced equally from the corresponding portion of the elongated cone. Alternatively, the followers could be of equal length and their supports be staggered to achieve the desired spatial relationship between the followers and cone. As a third alternative; a plurality of cones, having different profiles, could be mounted on the same shaft for individual coaction with each of the working stations whereby each working tool would be infed by a different cone cam all of which would be under the same control as that described in connection with the single cam. The rotational and/or translational speed of the cone may be pre-programmed to correspond to the most efficient operating parameters for each tool which will be used in a series of machining operations. Thus, where three tools are to sequentially engage the same area of the workpiece as in drilling, reaming and burnishing a single hole for example, various rotational, reciprocating and/or infeeding rates are required for each tool to work at maximum efficiency. These known values may be pre-programmed whereupon the speed of the recirculating member and the cone rotation and/or translation are varied in accordance with each tool changing cycle. The manner in which such programming is effected will become more apparent in the following detailed description of operation. When changing over from machining operations on one type material to another, the ability to utilize a single control, the cone cam, which may be programmed to provide infinitely variable infeeding rates is of paramount importance in that nothing more than the resetting of the programming controls is necessary to insure maximum efficiency of operation for each tool in machining a different material.

In addition to the rotary and translatory motion that may be imparted to the cone to control tool infeed, the same is also mounted for movement transversely of the axis thereof toward and away from the cam followers. The purpose of this latter cone movement, which occurs once during each tool change cycle, is to remove the cone from proximity to the followers while the tool rack undergoes the horizontal and vertical movements previously described to effect the tool interchange between the bearings and the tool support rack. The cone may be moved toward and away from the followers by mounting the same for linear bodily movement on ways that extend parallel to the axis of the cam followers or the same may be mounted for bodily pivotal movement toward and away from the followers.

As previously alluded to, the followers and tools engaged thereby may be initially positioned at any desired infeeding point either within a recess or hole previously machined or at a desired point relative to a recess of indeterminate depth. This initial positioning of the infeeding mechanism may be effected in one of two ways; first, the cone cam may be moved bodily toward and away from the followers to initially position the same; or the cone may be translationally shifted, along its own axis, to present a larger diametral surface of the cone to the followers at the time a particular machining operation is to be initiated. Where the cone is to be bodily moved toward or away from the cam followers to effect the desired starting point, removable stops may be provided to assure the proper positioning of the slide or pivoted member supporting the cone.

The tool changer is also provided with an additional recirculating driving member which may be used in conjunction with the previously described driving member to provide a compound rotary input to certain specialized tools as will be explained in greater detail as the description proceeds.

The aforementioned cone cam is integral with, or fixedly secured to, a shaft extending along the axis of the cone. The shaft is journalled in bearings supporting the cone and shaft for rotary and translatory motion. The shaft extends beyond one end of the cone for connection to the rotary and translatory motion imparting means and beyond the other end of the cone to support one or more auxiliary cone cams outside the confines of the tool changing mechanism previously described. The auxiliary cone may have any desired configuration in relation to the first cone and is, similarly, mounted for integral rotation and translation with the shaft. The purpose of the auxiliary cone is to actuate one or a plurality of followers whose output is impressed on a closed hydraulic slave system to transmit the same to any desired point. In some instances, the slave system is utilized in combination with at least one additional tool changing mechanism to provide the tool infeed therefor in a manner similar to that described above except that in the additional tool changing mechanism, the tool follower infeed elements are advanced into the work by connection with the hydraulic slave system as by bellows, pistons or the like.

The slave system is particularly advantageously used in certain machining operations performed in connection with the tool changer mechanism on which the auxiliary cone is mounted and makes possible combined operations not previously attainable. One example of such a combined operation involving a feedback from the auxiliary cone to the primary, or master, tool changer relates to the simultaneous drilling of a single workpiece from opposite sides thereof wherein the opposed drills performing the drilling operations are perfectly concentric with each other or offset a predetermined amount either by manually offsetting the tools or varying the tool spindle diameters. This opposed drilling feature is made possible by positioning an additional Vee bearing on the opposite side of the workpiece from the Vee bearings previously described and in alignment therewith. A recirculating element, similar to that previously described, may be mounted to drive a drill spindle resting on the additional Vee bearing and the output of the auxiliary cone fed, by way of the hydraulic slave system, to the end of the drill opposite the workpiece. The drill being infed by the slave system may thus be reciprocated, reciprocated and advanced, or merely advanced into the workpiece in consequence of the movement of the auxiliary cone cam. The opposed drills may be reciprocated either in or out of phase depending upon the angular relationship of the cone flats on the two cones.

Additionally, the auxiliary cam and slave system may be used to impart the simple reciprocating or advancing motion to a non-rotary tool positioned either for operation in conjunction with the primary tool changer or in connection with a completely diverse operation.

As will become more apparent from an understanding of the overall disclosure; the slave system may be utilized not only in the specific manner above mentioned, but also to impart all of the movements from a master tool changing console to a plurality of slave consoles. Thus, the slave system may be incorporated not only with the auxiliary cone cam to transmit infeeding motions to a remote location, but also analogous systems may be appropriately positioned to transmit all of the motions undergone by the tool changer herein described to other similar tool changers.

DESCRIPTION OF THE DRAWINGS

The manner in which the foregoing and other objects of the invention are made possible will become more apparent from the following detailed description when considered in conjunction with the drawings, wherein:

FIG. 17 is a side elevation of a work holder employed with the tool changer herein disclosed;

FIG. 18 is an elevational showing of the work holder of FIG. 17 as viewed from the left, thereof;

FIG. 19 is a top plan view of the work holder shown in FIG. 17;

FIG. 20 is a fragmentary elevational depiction of the work holder as viewed from the right of FIG. 17;

FIG. 21 is a sectional view taken along the line 21—21 of FIG. 18;

FIG. 22 is a sectional view taken along the line 22—22 of FIG. 21;

DESCRIPTION OF THE PREFERRED EMBODIMENTS

Figure 1:
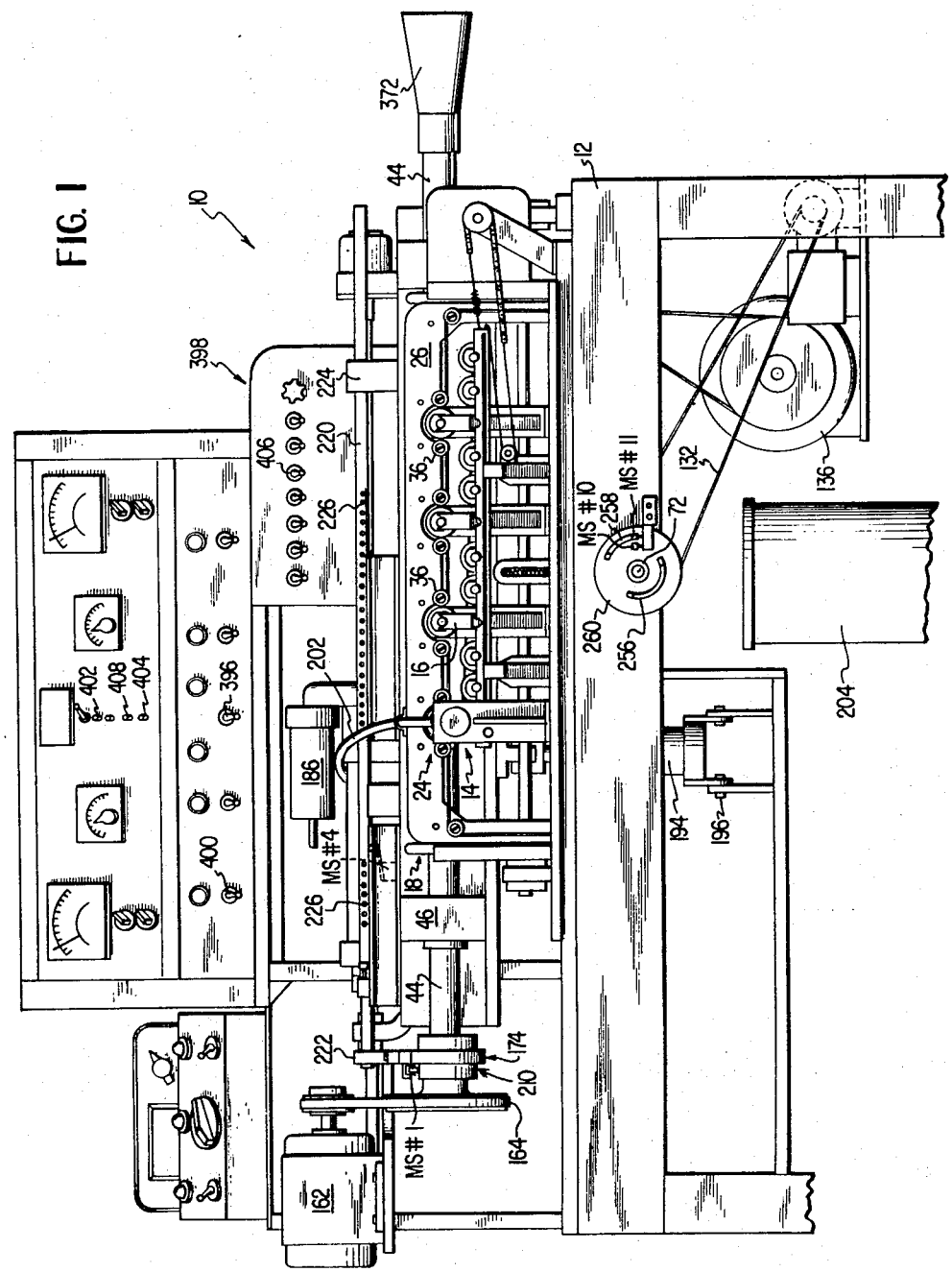
FIG. 1 is a front elevation of a tool changer constructed in accordance with the invention.

Referring first to FIGS. 1 and 5–7, an automatic tool changer constructed in accordance with the present invention is depicted generally at 10 and includes a work table 12, work stations 14, Vee tool bearings 16, tool positioning mechanism 18, tool infeed mechanism 20 and tool drive means 22.

Work stations 14, each, includes a work clamping and indexing mechanism, generally indicated at 24, which is actuated by air pressure at predetermined times in the cycle of operation to be subsequently described.

Tool positioning mechanism 18 includes a vertically movable placement rack 26 supporting a horizontally slidable tool support rack 28 thereon for vertical movement therewith. The Vee bearings 16 are secured to work table 12 in position to receive various ones of tools 30 thereon when placement rack 26 is in the lower position shown in FIGS. 1, 6 and 11. Tool support rack 28 is horizontally movable relative to vertically movable rack 26 in stepwise increments corresponding in distance to the spacing between preselected ones of tool support grooves or recesses 32 formed in support slide 28. Drive belt 34, mounted for vertical movement with rack 26, extends beneath idler pulleys 36. Adjacent pairs of idler pulleys 36 are positioned one on either side of the bearings and deflect the belt into approximately 180° engagement with pulleys 38 fixed to the spindles 40 of those tools 30 vertically aligned with Vee bearings 16 when the placement rack is in the lower position illustrated in FIGS. 1, 6 and 11.

Tool infeed mechanism 20 includes a cone camp 42 integral with cone shaft 44 that is mounted in bearings 46 carried by cone support slide 48 for rotary and translational movement relative thereto. Cone support slide 48 is pivotally mounted on rod 50 carried by table 12 for rocking movement, whereby cone cam 42 may be positioned to engage and disengage cam follower infeed elements 52 supported in bearing blocks 54 adjustably mounted on table 12. Cam follower infeed elements 52 are aligned with the spindles 40 of those rotary tools resting on Vee bearings 16. Cone cam 42 includes a major peripheral, substantially conical surface and a minor concave surface portion extending axially of the cone cam. When cone cam 42 is in the forward position of FIG. 11, rotation of the same results in reciprocation of the follower infeed elements and those tools resting on the Vee bearings as the cam followers cyclically engage the arcuate and concave portions of the rotating cone. Translational movement of the cone in the direction of the smaller end thereof, to the left as viewed in FIGS. 1 and 5, results in an incremental increase in the forward infeed of the tools toward the work stations during each revolution of the cone. Stated differently, the tools are reciprocated by the rotation of the cone and the path of reciprocation is incrementally fed forwardly into the work piece by virtue of the cone translation which continually presents a larger diameter portion of the cone for engagement with the follower infeed elements. The cone shaped surface of the cone cam may, if desired, be provided with a plurality of small longitudinally extending grooves 56 which act as chip breakers by providing a number of very short reciprocating tool strokes of short duration during each revolution of the cam. In many cases, grooves 56 will not be required and the major peripheral portion of the cone will be smoothly contoured to present a true conical surface.

TOOL BEARING SUPPORTS

Tool bearings 16 are of the Vee type disclosed and claimed in U.S. Pat. No. 2,607,244 and are fixedly secured to work table 12 as by threaded fasteners or the like. The Vee bearings are positioned to support spindles 40 of tools 30 in a horizontal position for combined rotary and reciprocating motion as described in U.S. Pat. No. 2,607,244. It will be noted that, because of the horizontal disposition of the bearings, the tools will be supported thereon even though tool driving pulleys 38 secured to tool spindles 40 are not engaged by the driving belt 34 as during a tool shifting operation to be subsequently described. Accordingly, it will be seen that tools 30 are not captively supported in their bearings as in the case of conventional tool changers. The fact that the tools are not captively held makes it possible to bodily interchange working tools in a manner not previously known.

TOOL POSITIONING AND DRIVING MECHANISM

Tool positioning mechanism 18 includes a vertically movable generally rectangular placement rack 26 supporting a horizontally movable tool support rack 28 thereon for vertical movement therewith and horizontal movement relative thereto adjacent bearings 16. Rack 26 is provided with vertical ways 58 coacting with rollers 60 supported in vertical roller support housings 62 secured to table 12 for movement between the upper and lower positions shown in FIGS. 7 and 6, respectively. The placement rack 26 is maintained in the lower position during the tool working portion of the work cycle and carries tool drive belt 34 thereon which, by virtue of the arrangement of idler pulleys 36, results in rotation of the tools positioned on bearings 16 in a manner that will be subsequently explained. Rack 26 is momentarily held in the upper position shown in FIG. 7 during that time required for the horizontal support rack to be shifted a distance equal to the spacing between predetermined ones of the recesses 32 formed therein. The manner in which vertical placement rack 26 is shifted between its upper and lower dwell positions will be apparent from an inspection of FIGS. 6–8 and 16. The lower edge of the rack has secured thereto a pivot pin 64 supporting roller 66 thereon for engagement with cam groove 68 formed in cam 70. Cam 70 is eccentrically secured to shaft 72 journalled in bearings carried by brackets 74 extending downwardly from table 12. Rack drive belt 76 is trained over pulley 78 which is secured to shaft 72. Shaft 72, cam 70 and pulley 78 are rotated as a unit by electric motor 80 and electric clutch 82 transmitting drive to the belt via motor-clutch pulley 84. Motor 80 and clutch 82 are both energized by a single electrical input. Motor 80 is cyclically energized, in a manner to be described, to rotate shaft 72 and cam 70 through 180° to shift the rack between the lower tool working position, indicated in FIG. 6, and the upper tool changing position shown in FIG. 7.

Horizontal positioning rack 28 has slide bearing grooves 86 formed therein for coacting with slide bearing elements 88 rigidly supported on rack 26. The output shaft of the horizontal rack positioning motor 90 has a sprocket secured thereto over which a flexible driving member 92, including an intermediate chain portion 94, is trained. Driving member 92 passes around reversing pulley 96 and attaches to the end of rack 28 adjacent the motor and point of attachment of the other end of the flexible member. Electric motor 90 is energized, in the upper placement rack position, to shift the support rack horizontally and bring a new drill into alignment with various ones of the bearings 16. Accordingly, the motor 90 is cyclically energized to move the support rack a distance corresponding to the spacing between preselected ones of the recesses 32 and tools 30 supported therein.

Figures 8, 9, 10:
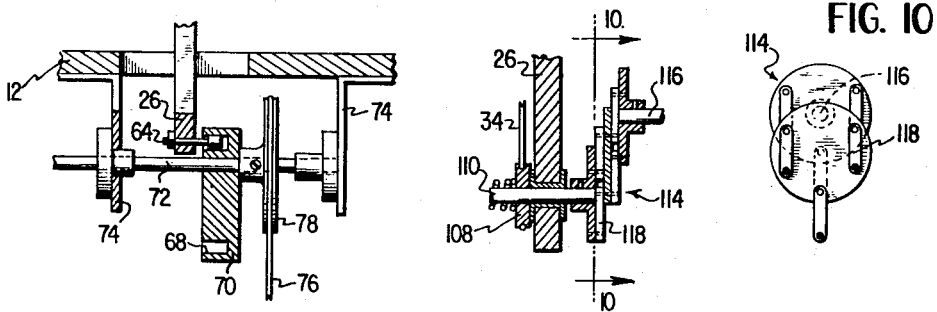
FIG. 8 is a sectional view taken along with line 8—8 of FIG. 6 illustrating the mechanism for raising and lowering the drill placement rack.
FIG. 9 is a sectional view taken along the line 9—9 of FIG. 6 illustrating a flexible drive coupling used to transmit driving torque between relatively moveable shafts.
FIG. 10 is a sectional view taken along the line 10—10 of FIG. 9.

Front tool drive belt 34 is supported on vertically movable placement rack 26 for vertical movement therewith. With rack 26 in the upper position, belt 34 exhibits a substantially horizontal run between idler pulleys 98 and 100 passing beneath and engaging the undersurfaces of intermediate idler pulleys 36 whose function is to effect driving engagement between the belt and preselected ones of the tools when the rack is lowered. From the right hand idler pulley 98, as viewed in FIGS. 6, 7 and 16, belt 34 extends vertically downward to change direction passing around idler pulley 102 prior to its passage over lower idlers 104, spring biased belt tightener 106, driving pulley 108 and back to upper idler pulley 100. The lower idler adjacent driving pulley 108 is so positioned in relation thereto as to insure the engagement of belt 34 with a major portion of the driving pulley circumference. Driving pulley 108 is secured to shaft 110 journalled in rack 26 that is driven by electric motor 112, secured to the undersurface of table 12, through conventional flexible coupling 114 which is best illustrated in FIG. 9. As will be apparent from an inspection of FIGS. 9, 10 and 16, rotation of input shaft 116 of coupling 114 results in a corresponding rotation of output shaft 110 while the same is permitted to undergo vertical movement relative to input shaft 116 via the pivotally related link connections 118 illustrated, in part, in FIG. 10. The output of motor 112 drives coupling input shaft 116 while the coupling output shaft 110 is journalled adjacent the lower left hand edge of rack 26 and has belt driving pulley 108 secured thereto. Accordingly, the output of motor 112 is transmitted to drive pulley 108 at all vertical positions of the rack in relation to the stationary motor.

Figure 11:
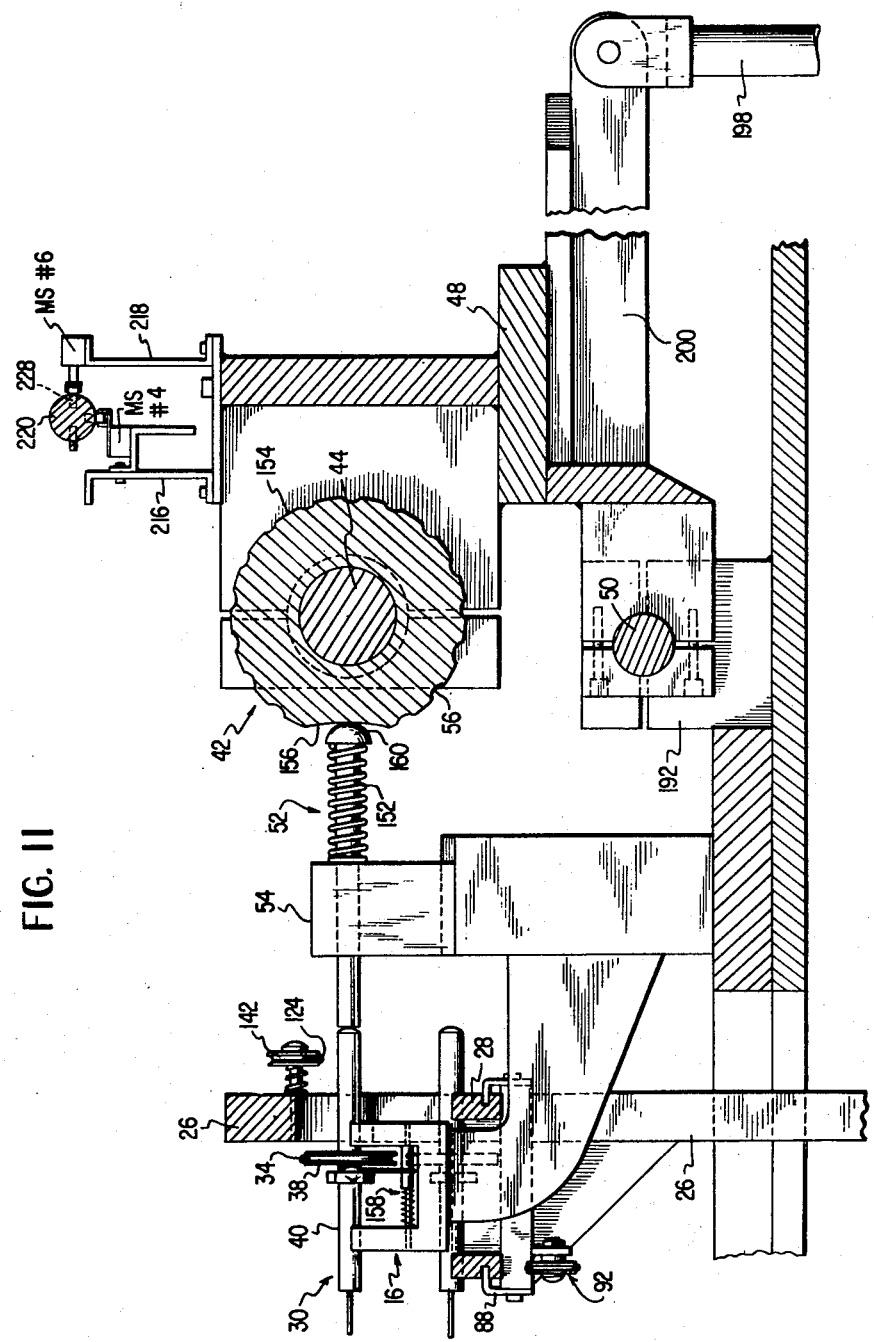
FIG. 11 is a sectional view taken along the line 11—11 of FIG. 5.
Figure 12:
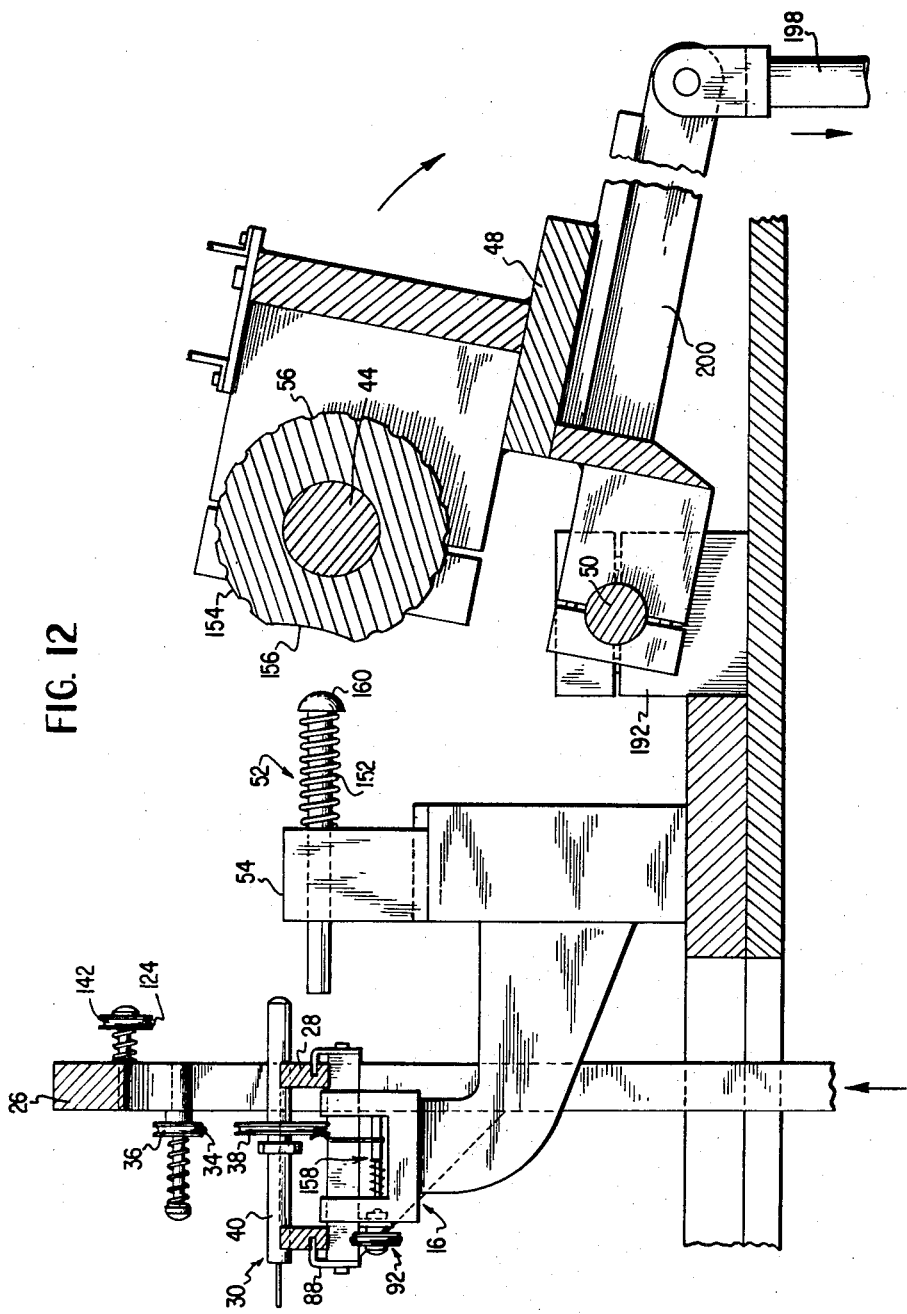
FIG. 12 is a view similar to FIG. 11 but illustrating the cone cam as being shifted rearwardly from the FIG. 11 position, as during a tool changing operation.

It will be noted, from FIGS. 11 and 12, that the idler pulleys engaged by the upper run of belt 34 are spring biased rearwardly to permit the idler pulleys to reciprocate and follow movement of the belt toward and away from the work stations as the tools rotated thereby are reciprocated.

Horizontal tool positioning rack 28 is provided with a plurality of pairs of aligned upwardly opening tool supporting recesses 32 formed in the upper surfaces of the generally rectangular frame comprising the support rack. Each pair of recesses is designed to receive a tool spindle 40 therein and support the same in non-captive fashion whereby any tool may simply be lifted from its supporting recesses when the rack is in any position.

Downwardly opening recesses 120, corresponding in number to the Vee bearings 16, are provided in placement rack 26 with the central portions thereof in vertical alignment with the respective Vee bearings. A pair of the intermediate idler pulleys 36 are located one on either side of each recess 120.

Figure 6:
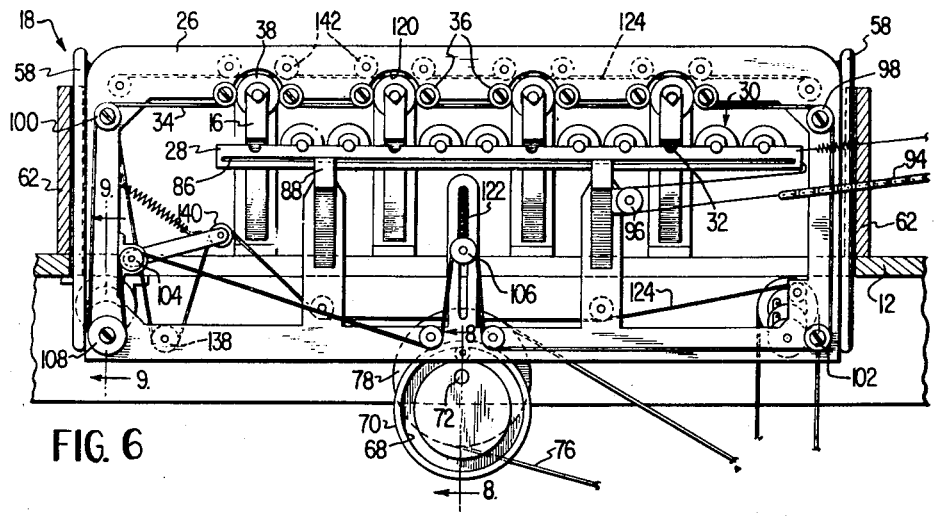
FIG. 6 is a fragmentary front elevation illustrating the drill placement rack and horizontal support rack positioned for a machining operation.
Figure 7:
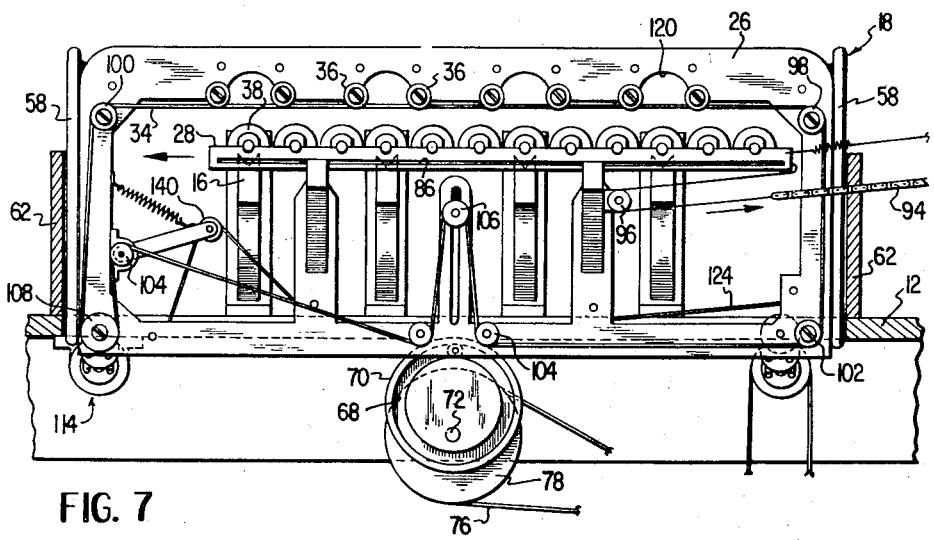
FIG. 7 is a view similar to FIG. 6, but illustrating the placement and support racks positioned for a tool changing operation.

When tools are positioned in Vee bearings 16 and the rack is lowered to the position of FIG. 6, the intermediate idler pulleys on each side of the corresponding vertically aligned recesses 120 force the drive belt downwardly, relative to the tool spindle pulleys, and into engagement therewith throughout approximately 180° of the pulley circumferences. Spring 122 of belt tightener 106 yields to permit the entrainment of belt 34 about pulleys 38. The permissible length of travel of the belt tightener is sufficient to permit the belt to be entrained about all of the tool spindle pulleys positioned in the Vee bearings when the rack is lowered. Because of the fact that drive belt 34 may be brought into engagement with spindle pulleys 38 and removed from driving engagement therewith merely by lowering and raising the rack, it will be appreciated that it is unnecessary to stop the recirculating driving belt when changing from one tool to another.

Figure 13:
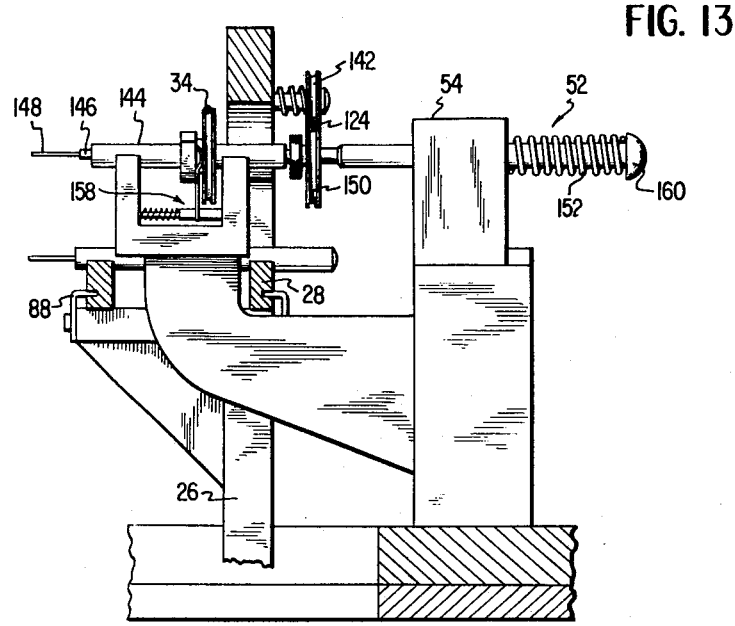
FIG. 13 is a view similar to FIG. 11, but omitting the cone cam, which illustrates a different type tool that may be provided with a compound rotary input.
Figure 15:
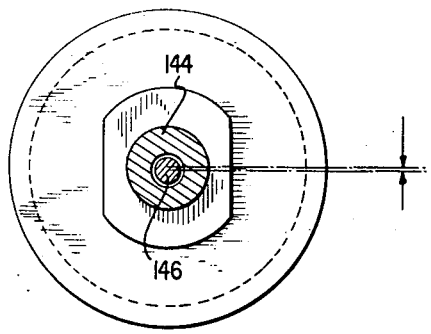
FIG. 15 is a sectional view taken along the line 15—15 of FIG. 14.
Figure 16:
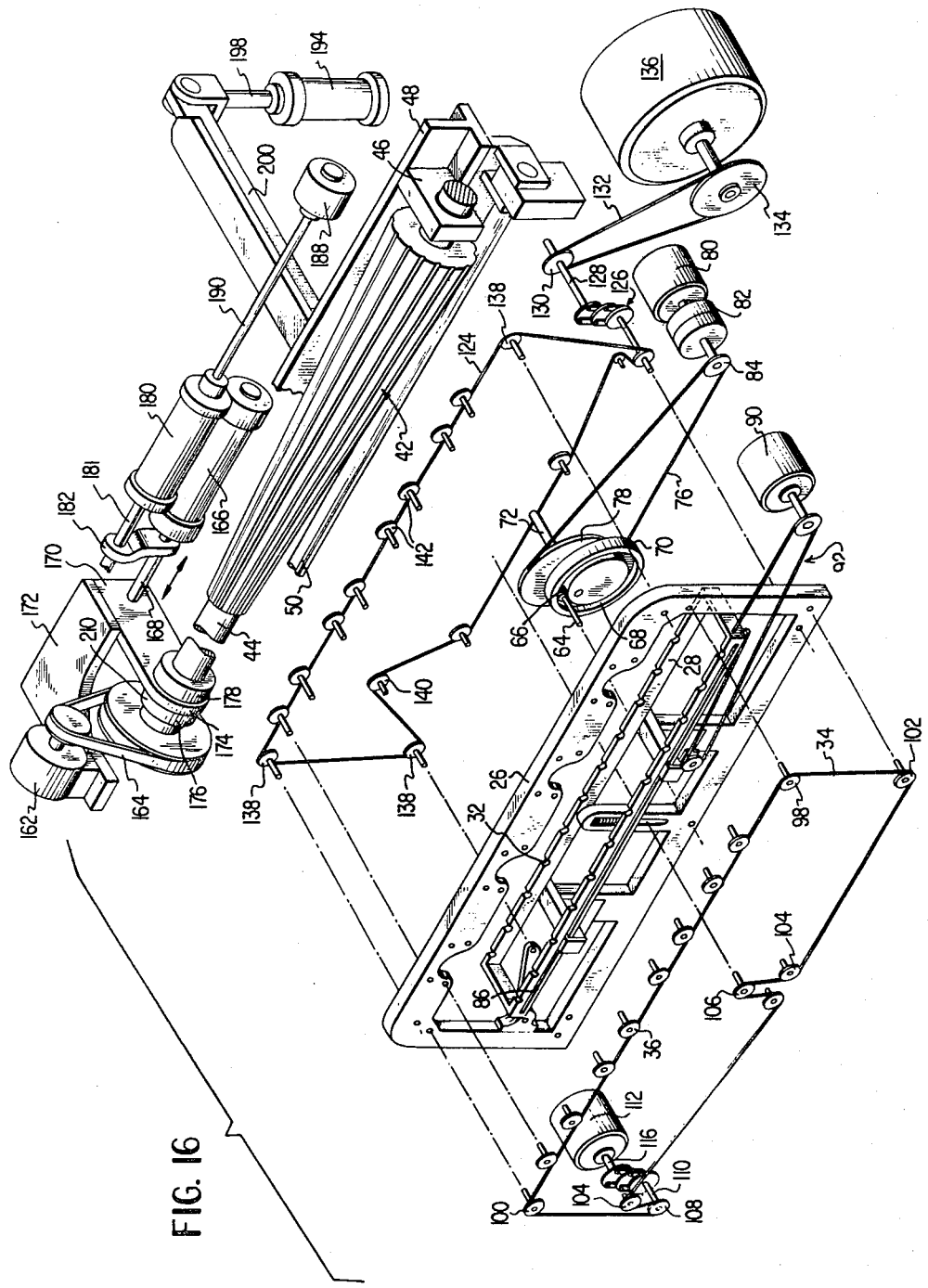
FIG. 16 is an exploded diagrammatic view of the various driving means employed in the tool changer.

Rear drive belt 124 is driven through flexible coupling 126, similar to that described in connection with the front drive belt, which is journalled adjacent the lower right hand edge of placement rack 26, as viewed in FIG. 16. The input of flexible coupling 126 is secured to shaft 128 which also has secured thereon pulley 130 in driving engagement with drive belt 132 extending from a pulley 134 secured to the output shaft of electric motor 136. Rear drive belt 124 is trained over change direction idler pulleys 138 and belt tightener 140. The upper run of belt 124 extends beneath rear intermediate idler pulleys 142 positioned one on either side of rack recesses 120 at the rear side thereof in a manner similar to that described in connection with front intermediate idlers 36. Rear intermediate idlers 142 are spaced at a somewhat higher level than the front idlers since the tools to be driven thereby do not require 180° driving engagement between the belt and tool driving pulley though it will be understood that the degree of engagement is a matter of choice that may be varied under various working conditions. The purpose of the rear drive belt is to provide a compound drive input to certain type tools that may be employed in the practice of the invention. For example, with reference to FIGS. 14 and 15, wherein the details of a burnishing tool designed to undergo compound working movement is illustrated, and with further reference to FIG. 13 showing the same in working position; it will be appreciated that the front drive belt rotates tool spindle 144 which, because of the eccentric mounting of spindle 146 therein, results in an orbital movement of working or furnishing member 148. The drive imparted to rear pulley 150 by the rear belt results in rotation of working member 148 while the same is driven in an orbital path by virtue of the rotation of spindle 144 by front belt 34. The offset relationship of the center lines of spindles 144 and 146 is indicated by the parallel phantom lines in FIGS. 14 and 15.

TOOL INFEED MECHANISM

The basic tool infeed mechanism for reciprocating and/or imparting linear infeeding motion to the various tools includes cam follower infeed elements 52 and cone cam 42. Cam followers 52 are supported for reciprocating movement in cam follower supports or bearing blocks 54, four of which are shown in the drawings. The axes of the followers are coaxial with the tool spindles when the same are positioned in respective aligned bearings 16. Springs 152 urge the followers toward cone cam 42. The cone cam has a major peripheral, substantially conical surface 154 interrupted by concave surface 156 extending generally axially of the cone. The relationship of cam follower supports 54 to the cone and tool spindle bearings is such that the followers engage the rear end of the tool spindles and urge the same forwardly against the bias of tool biasing assemblies 158 when the follower heads 160 are engaged by the conical cam surface 154, and are permitted to retract by a distance equal to the difference in radii between conical surface 154 and the central portion of concave surface 156 when the concave portion of the cone cam is rotated into opposition to the followers. Accordingly, if the cone cam is rotated about its own axis by electric motor 162 driving cone cam shaft 44 through timing belt 164; the followers 52, and tools 30 positioned on spindle bearings 16, will be reciprocated in a non-advancing path of reciprocating motion. Cone cam 42 is mounted for both rotary and axial translatory movement relative to cone slide support 48 by bearings 46 fixedly carried by support 48.

Translation of cone 42 is effected by pneumatic motor 166 having piston rod 168 secured to flange 170 of motor mounting plate 172 whose forwardly extending arm portion 174 transmits the linear output of motor 166 to cone 42. Cone shaft 44 is journalled in arm 174 which is fixed against axial movement relative to the cone shaft by its intermediate position between cam 176 and collar 178 both of which latter two elements are secured to cone shaft 44 for rotation therewith. Hydraulic damping cylinder 180 has its piston rod 181 rigidly interconnected with air motor piston rod 168 by arm 182 and clamping nuts 184 for parallel unitary movement therewith. The magnitude and speed of the air motor output may thus be controlled by controlling the size of a by-pass orifice within hydraulic damping cylinder 180 which is supplied with hydraulic fluid from reservoir 186. Air motor 166, damping cylinder 180 and reservoir 186 are sold as an integrated unit identified as a Parallel Mount Assembly, and further identified by Model Nos. BM w/HC-128 and BM w/DC-50A by Bellows-Valvair Corporation of Akron, O. Electric motor 188 is interconnected with the damping orifice control within hydraulic cylinder 180 by rotary output extension shaft 190. In addition to the virtually infinite control that may be imposed on the linear output of air motor 166 by varying an internal by-pass orifice; a second by-pass 191 having an on-off solenoid air valve is provided. This second by-pass, which will be subsequently referred to, effects complete stoppage of the movement of air motor piston rod 168 by blocking movement of hydraulic damping rod 181. Thus the internal orifice, controlled by motor 188, is subordinate to the control effected by the second by-pass 191. When the valve in by-pass 191 is closed air motor piston rod 168 cannot move and when the same is open, the output of rod 168 may be virtually infinitely controlled by controlling the variable orifice through motor 188.

Cone cam 42 may be shifted bodily toward and away from followers 52 in any desired manner such as by mounting the cone slide support 48 on ways for back and forth reciprocating movement or by pivoting the same for forward and rearward rocking movement. Cone slide support 48 is herein illustrated as being pivotally mounted on pivot shaft 50 supported by bearing blocks 192. Pneumatic motor 194 is pivotally connected to support table 12 at 196 and the piston rod 198 thereof is pivotally connected to arm 200 extending rearwardly from cone support slide 48. Extension and retraction of piston rod 198 results in oscillatory rocking movement of the cone slide support 48 and cone cam 42 between the positions indicated in FIGS. 11 and 12.

As previously explained, when the cone cam is in the forward follower engaging position of FIG. 11, rotation of the cam results in non-advancing reciprocation of the followers and tools. If, as the followers and tools are being reciprocated by the rotation of cone 42, the cone is translated axially by energization of air motor 166, the reciprocating path of movement undergone by the tools will be advanced due to the increasingly larger diameter of the conical portion of the cone cam successively presented to each of the followers. It will be appreciated that the spacing of follower supports 54 and the length of followers 52 is so selected that in the extreme left-most position of cone translation, as viewed in FIG. 5, where the largest diametral portion of cone surface 154 is engaged by the various followers, the depth of concave surface 156 is such as to permit withdrawal of the tool from the workpiece indicated at 320 in FIG. 20. As a practical matter, this result may be achieved either by positioning the follower supports generally along a line parallel to conical surface 154 or by varying the length of the followers in the manner indicated in FIG. 5.

The ability to exercise virtually infinite control over the advance of a constantly reciprocating tool is one of the major features of the invention. Reciprocation of the tool is normally desired to permit chip removal and preclude overheating of the tools during a working operation; and by virtue of the fact that this reciprocation may be combined with an infinitely controlled infeed merely by controlling a single element, i.e., the cone cam makes possible methods of machining not previously considered to be practicable.

A nozzle 202 interconnected with coolant reservoir 204 by line 206 is positioned adjacent each work station to flush away chips and provide a fluent coolant for the workpiece and working tools.

During that interval of time when the concave surface 156 of cone cam 42 is positioned for engagement by the followers, and the tools and followers are retracted; the axial translation of the cone is interrupted so that upon re-engagement of the work by the tools, the tools resume operation at the same depth of penetration.

There are many machining operations in which reciprocation of the tool during infeeding is neither necessary nor desirable. In such cases, rotation of the cone is arrested by de-energizing motor 162 with the conical surface 154 of the cone in engagement with the followers, after which time the cone is translated axially to advance the tools in a non-reciprocating manner.

The conical surface of the cone cam may be provided with a plurality of shallow grooves 56 extending parallel thereto which imparts a series of very small reciprocating movements to the tools during each fraction of cone revolution during which the followers are traversing the conical surface. This relatively rapid reciprocation immediately adjacent the working face provides an excellent chip breaking action which occurs simultaneously with the tool infeeding operation and greatly facilitates chip removal by the cleaning fluid ejected from nozzle 202 during the tool retraction period when the tools are entirely withdrawn from the workpiece. In many cases, the grooves 56 will be omitted and surface 154 will present a smooth conical surface to the followers.

CONTROL SYSTEMS

Figure 23:
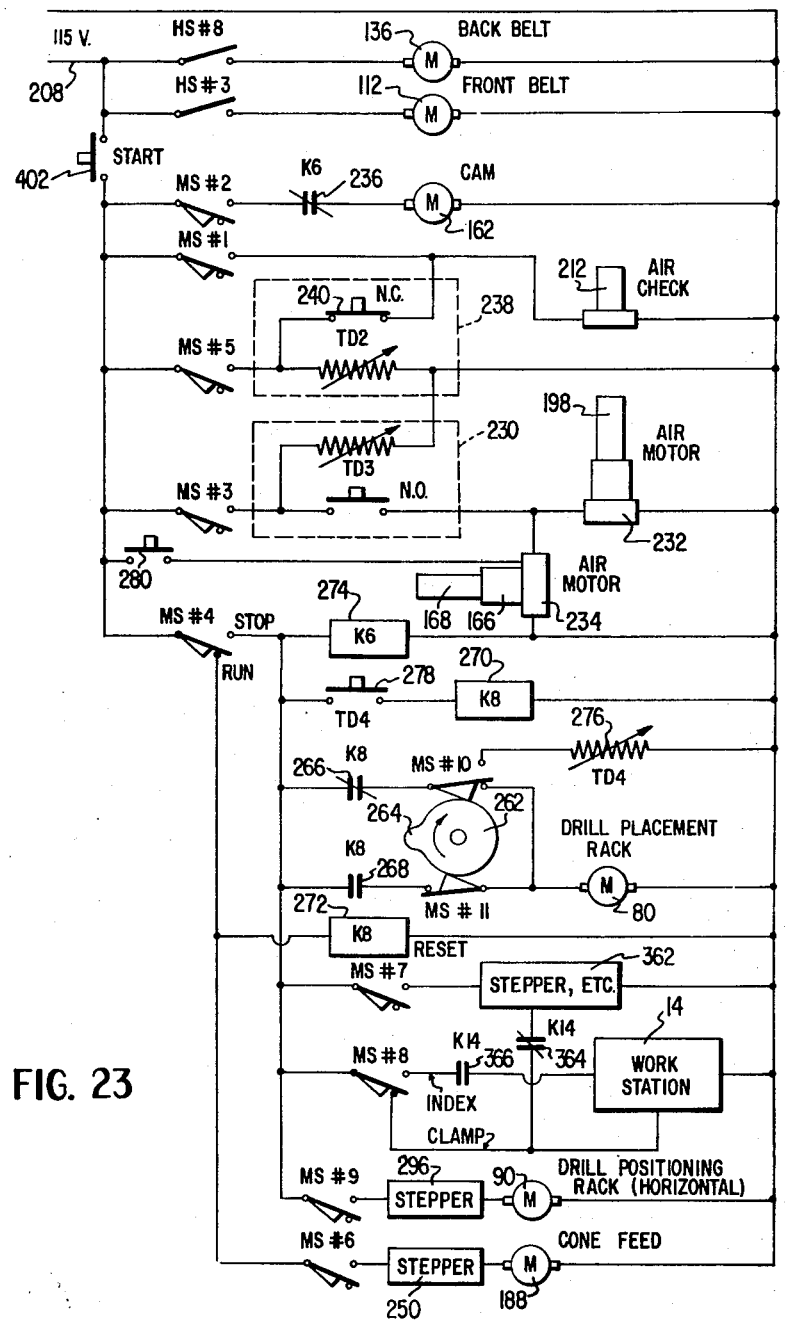
FIG. 23 is a diagrammatic illustration of the control circuitry embodied in the present tool changer.

A schematic illustration of the basic electrical control systems involved in the energization of the various operating components previously described appears in FIG. 23. Continued reference to this Figure will facilitate an understanding of that portion of the following detailed description which is directed primarily to FIGS. 1 and 3–5 wherein the actual relationships of the various control switches and operating mechanisms therefor are best illustrated.

A detailed description of the physical location of the microswitches and the circuits controlled thereby will be followed by a description of the manner in which the various circuits are inter-controlled to achieve the desired results.

Microswitch number 2 (M.S. #2) is mounted adjacent the rear of the tool changer (see FIG. 4) to be engaged by arm 200 when the same is elevated by motor 194 to bring the cone into engaging position with the cam followers. Normally open M.S. #2 functions as a safety switch preventing the rotation of cone cam 42 when the cam is withdrawn from the cam follower engaging position, by rearward rocking movement about the axis of shaft 50, to the position indicated in FIGS. 4 and 12. When cone slide 48 is rocked forwardly, arm 200 engages M.S. #2 to complete the circuit between power lead 208 and cone cam motor 162.

Normally open microswitch number 1 (M.S. #1) is mounted on arm 174 and positioned for cyclic actuation by arcuate portion 210 of cam 176 secured to cone shaft 44 for rotation therewith. M.S. #1 cyclically activates solenoid air valve 212 to pulsate horizontal air motor 166 and advance cone cam 42 to the left. As previously explained, the rate of linear cone advancement is controlled by hydraulic damping cylinder 180 containing a by-pass orifice whose area may be infinitely controlled by rotation of shaft 190 by motor 188. M.S. #1 operates to control a different by-pass, indicated at 191 in FIG. 4. By-pass 191 must be open before the orifice control imposed by motor 188 is effective. Closure of by-pass 191 through closure of solenoid air valve 212 locks movement of rods 168 and 181.

When M.S. #1 reaches flat 214 on cam 176, the switch is opened terminating the axial translational movement of the cone until the switch is again closed by engagement with arcuate cam portion 210. It will be recalled that the linear output of motor piston rod 168 is transmitted to the cone cam via flange 170 and arm 174. The cone is thus continuously rotated by motor 162 and translationally advanced in a series of intermittent movements interrupted by "pauses" during that time M.S. #1 engages flat 214. The angular relationship between cam flat 214 and the cone cam flat, or concave surface, 156 is so selected as to insure that the pause in the translational movement of cone cam 42 occurs during that portion of the cycle when cam follower infeed elements 52 engage concave surface 156 of the cone cam. This pause is the period of time during which tools 30 are retracted from the workpiece by tool biasing assemblies 158 to facilitate chip removal. Because the translational movement of the cam is "paused" during the tool retraction period, the tools will engage the workpiece at the same depth when cam followers 52 are again urged forwardly into engagement with the tool spindles by engagement with arcuate portion 154 of the cone. It will be apparent that, as the cone is rotated and translated in step-wise fashion to the left, the tools are reciprocated and cyclically fed further into the workpiece in an advancing path of reciprocating movement.

Microswitches numbered 3, 4, and 5 are supported on a stationary generally U-shaped switch supporting bracket 216 adjacent a similar bracket 218 on which is mounted microswitch number 6. Brackets 216 and 218 are mounted adjacent program control rod 220 that is secured at one end thereof to an adapter 222 mounted on arm 174 for movement therewith. The other end of program control rod 220 is received in slide bearing mount 224. Program control rod 220 is thus mounted for translating movement with cone cam 42. Microswitches 3, 4, 5, and 6 are so mounted on their respective brackets as to bring their operating arms into immediate proximity to, and in alignment with a plurality of rows of threaded openings 226 adapted to removably receive microswitch actuating abutments or pins 228. As the program control rod is translated axially, the microswitches 3, 4, 5, and 6 are actuated in a predetermined fashion by the selective positioning of pins 228 in various ones of the openings 226.

Normally open microswitch number 3, the return switch, is actuated by an appropriately positioned abutment to initiate the tool change operation. An abutment 228 is positioned to engage M.S. *3 at that point in the axial translation of the cone when the working tools have completed their operation on the workpiece, and new tools are to be interchanged therewith. M.S. *3 decreases the rpm of motors 162 and 112, by conventional circuitry not shown, to retard the rotation of cone 42 and the linear velocity of front drive belt 34. Additionally, M.S. *3 actuates a time delay relay 230 which, after the delay, activates solenoid air valve 232 to retract piston rod 198 and rock the cone cam slide and cone rearwardly out of engagement with the cam follower infeed elements. Relay 230 also activates solenoid air valve 234 to retract horizontal air motor piston rod 168 to return cone cam 42 to the right.

Microswitch number 4 (M.S. *4) is a safety switch which is activated by an appropriately positioned abutment when the cone is returned to the right to energize the coil of relay K6 whose normally closed switch 236 is in circuit with cam motor 162. When the coil is energized, switch 236 is opened preventing rotation of cam motor 162 and cone 42 during the tool changing cycle. Additionally, M.S. *4 functions as a safety switch in the circuit of placement rack motor 80, which safety switch must be in the "stop" position of FIG. 23 before the placement rack motor can be energized in a manner to be described. The "run" position of M.S. *4, as indicated in FIG. 23, is the switch position when the tools are working. The "stop" position corresponds to the tool interchange portion of the working cycle at which time placement rack motor 80 may be energized. M.S. *4 is moved to the "stop" position of FIG. 23 by an appropriately positioned abutment 228 when the cone is shifted all the way to the right.

Microswitch number 5 is connected in circuit with solenoid air valve 212 to provide a secondary manner of pulsating horizontal air motor 166 in addition to that effected by M.S. *1 which, it will be recalled, functions to pause cone translation during a fractional portion of one cam revolution. The purpose of M.S. *5 is to introduce a longer pause in cone translation. When M.S. *5 is closed by engagement with an appropriately positioned abutment, solenoid air valve 212 is closed and the linear advancement of air motor 166 is stopped momentarily to terminate the translation of cone cam 42 for an interval of time sufficient for the came to make several revolutions. Simultaneously with the stoppage of air motor 166, M.S. *5 activates a time delay relay 238 that, after a short interval, opens normally closed relay switch 240 allowing air valve 212 to reopen and permit continued cone advancement by air motor 166. The pause initiated by M.S. *5 is, like the shorter pause initiated by M.S. *1, designed to facilitate chip removal. The longer pause is required in certain machining operations, whereas in others the shorter pause occuring during each cone revolution is sufficient. In this latter case, no abutment pins are provided in the apertures 226 aligned with M.S. *5.

Normally, each of the individual type tools that will perform machining operations on a workpiece will not only require respectively different infeed rates but, also, will require variations in the infeed rate of each type individual tool for maximum efficiency. Thus, in a drilling operation for example, it is desirable to initially penetrate the material with a relatively slow infeed rate which should then be increased and again slowed prior to breakthrough. The variations in tool infeed rate are effected by varying the area of the by-pass orifice in hydraulic damping cylinder 180 by energization of motor 188 and rotation of control shaft 190 to vary the translational speed of cone 42.

Figure 3:
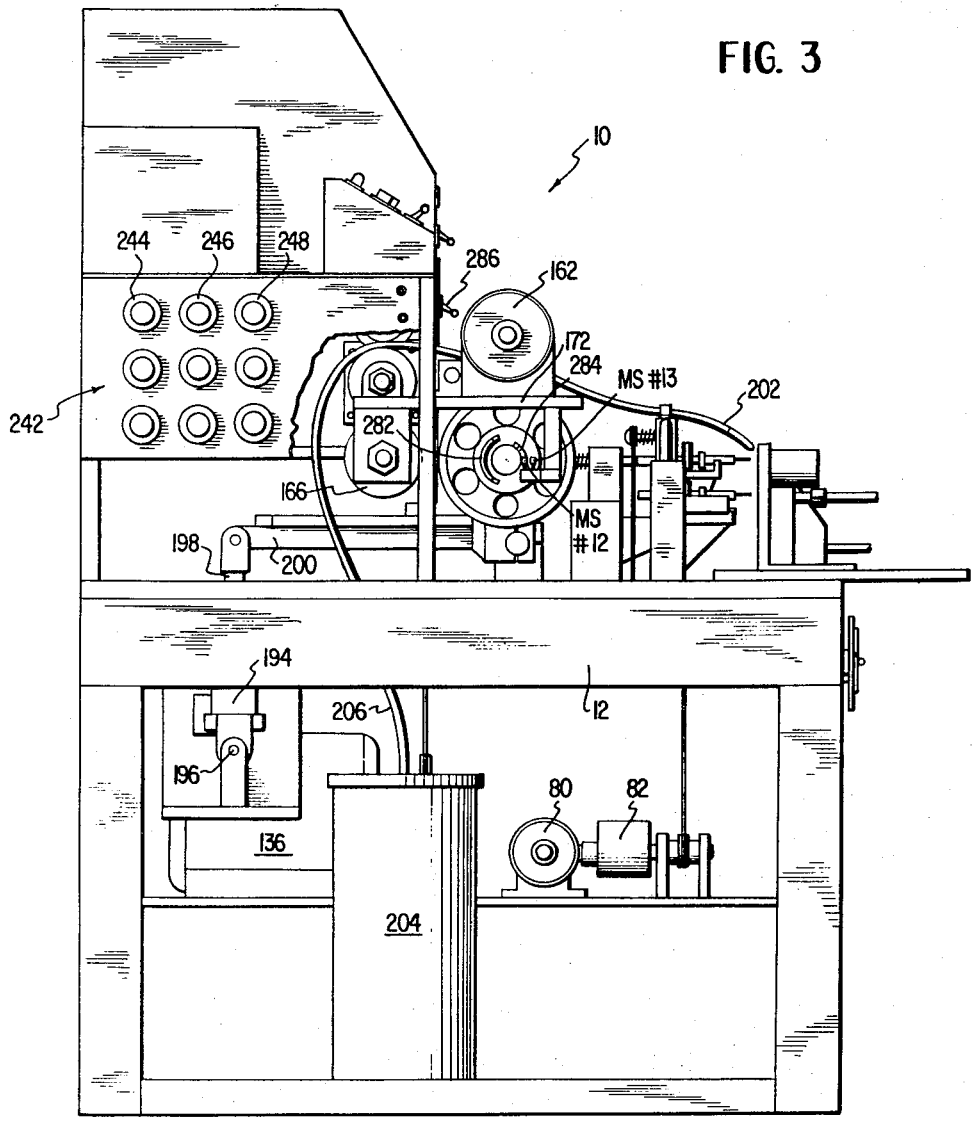
FIG. 3 is a side elevation, with parts broken away, as viewed from the left of FIG. 1.
Figure 4:
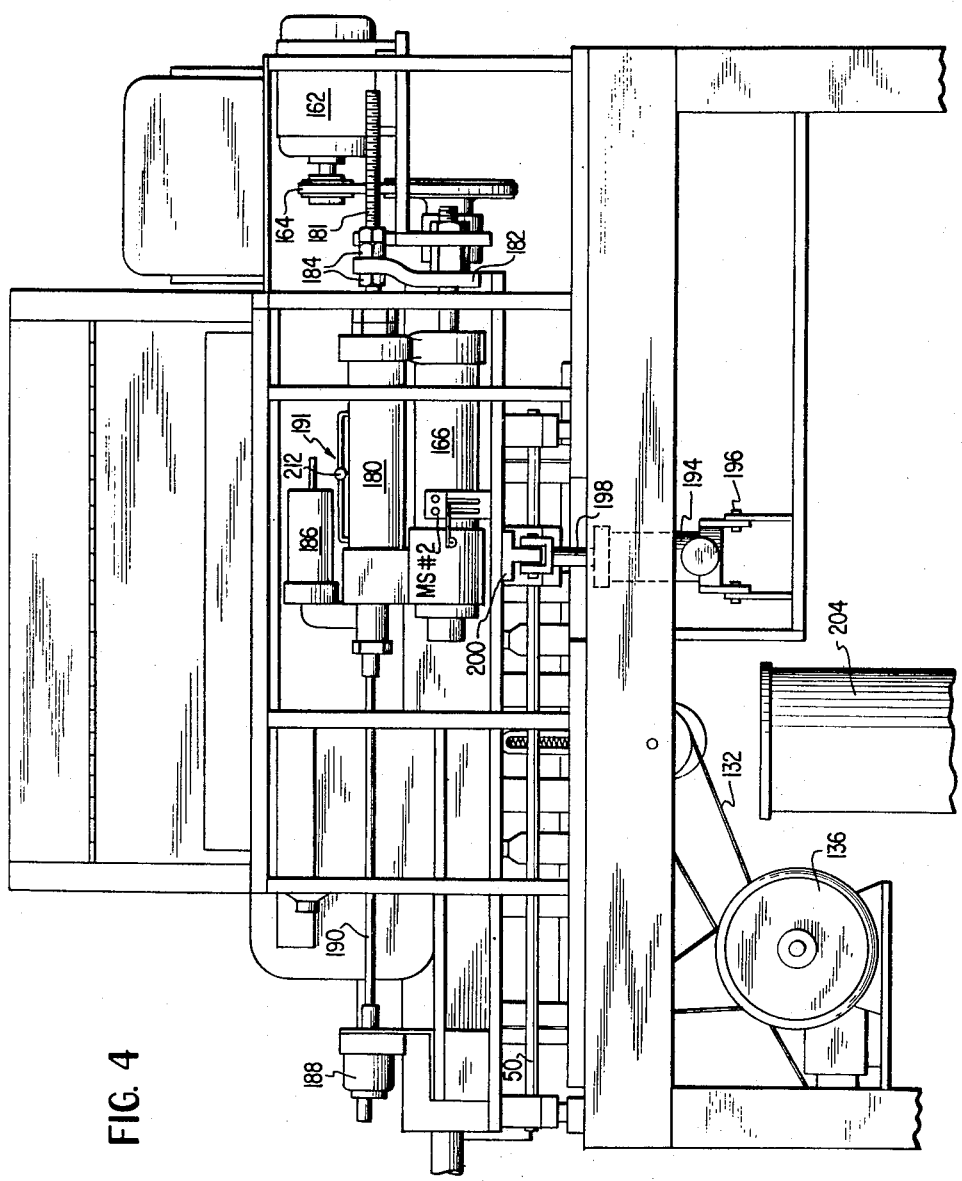
FIG. 4 is a rear elevational view of the tool changer shown in FIG. 1, with the cone cam in non-working position.
Figure 5:
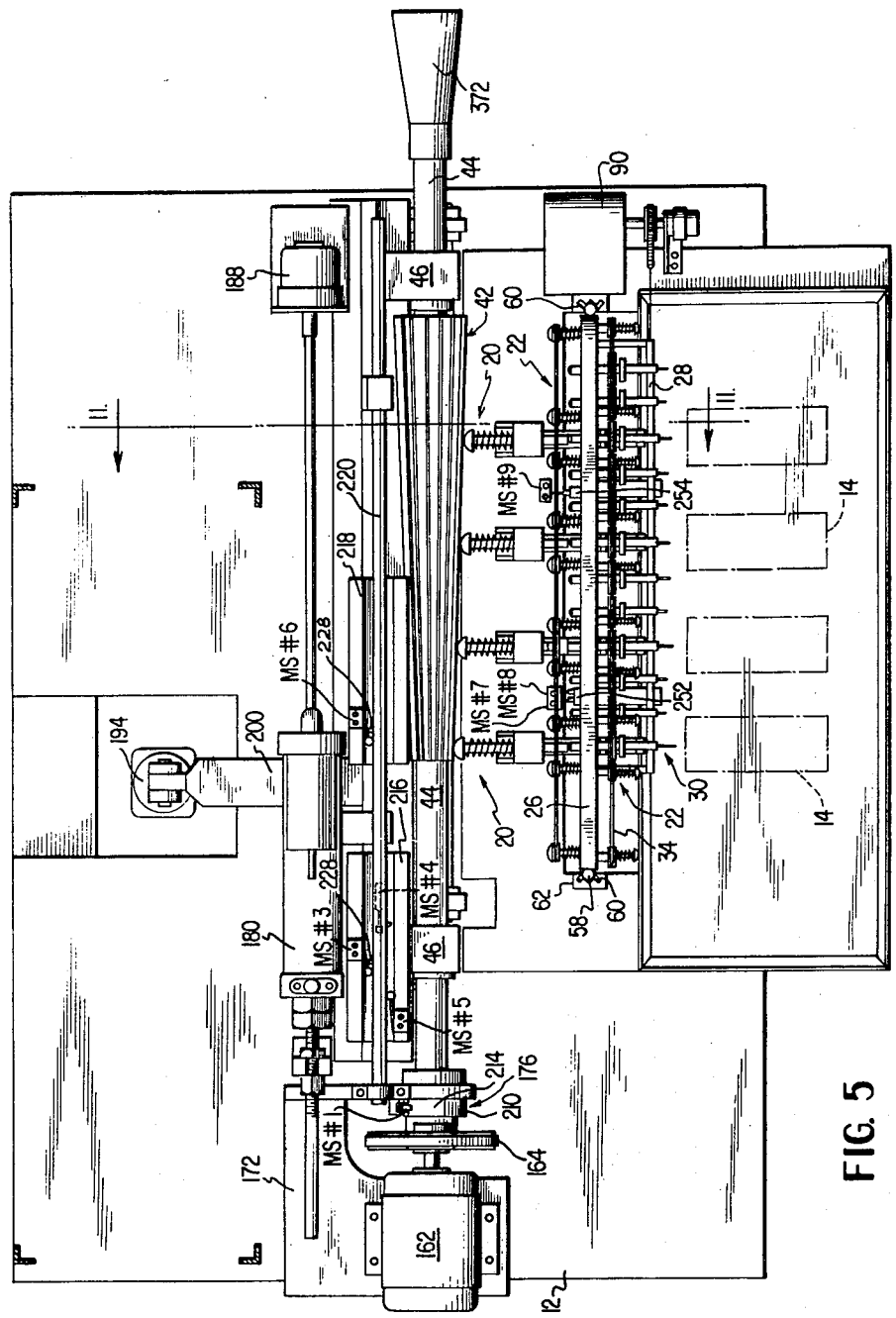
FIG. 5 is a top plan view of the tool changer mechanism, shown in FIG. 1, with the control consoles removes for clarity of illustration.

The desired infeeding rates are programmed into the tool changer by the selective positioning of a plurality of abutments 228 for engagement with microswitch number 6 (M.S. *6) and the nine bridge circuit control dials indicated generally at 242 (FIG. 3). Each of the conventional bridge circuits (not illustrated) controlled by the dials 242 may be set for a different electrical output to rotate output extension shaft 190 of motor 188 a controlled amount in a desired direction for opening or restricting the by-pass orifice in hydraulic damping cylinder 180.

Assume, as in the preceding example, that it is desired to provide three different infeed rates for each of three tools that will sequentially engage the same area of a workpiece. In the case of the first tool performing a drilling operation requiring three separate infeed rates as discussed above, the left-most dial 244 in the upper horizontal row is set to provide an electrical output that will drive motor 188 in a direction to restrict the by-pass in damping cylinder 180; the second dial 246 is set to enlarge the by-pass and the last dial 248, in the row, is set for a more restricted by-pass corresponding to the desired breakthrough infeed rate. Three abutments 228 are appropriately positioned in the row of threaded openings 226 aligned with M.S. #6. The positioning of abutments 228 correspond to the translational position of the cone at the time it is desired to vary the infeed rates of the working tools. M.S. *6 actuates a conventional stepping mechanism 250 that sequentially connects each of the bridge circuits controlled by dials 242 in circuit with cone translational speed control motor 188. Accordingly, as M.S. *6 is actuated by each of the abutments, motor 188 is actuated to vary the cone translational speed.

The actuating arms of microswitches #7 and #8 are positioned to be engaged by abutment 252 (FIG. 5) carried on drill placement rack 26 which, also, carries abutment 254 to engage the actuating arm of microswitch #9. Microswitches #7 and #8 control the indexing and locking mechanisms at each of the work stations 14. The manner in which the workpiece at each work station is clamped in position and indexed at appropriate times in the overall cycle of operation will be more fully explained in the ensuing detailed description of the work station. Suffice to say, at this point, that actuation of M.S. #8 by upward movement of rack 26 permits the workpiece to be indexed by an indexing mechanism that is energized by the actuation of M.S. #7 which, also, is actuated by the same abutment 252 engaging M.S. #8 upon upward movement of rack 26.

Microswitch number 9 is actuated by engagement of the actuating arm thereof with abutment 254 upon each upward movement of rack 26 to energize horizontal rack positioning motor 90 to shift drill positioning rack 28 to position different ones of the tools 30 in vertical alignment with the Vee bearings.

Microswitches #10 and #11 are mounted on table 12 and the actuating arms thereof are positioned to engage cam tracks 256 and 258, respectively. Cam tracks 256 and 258 are formed on cam plate 260 which is rigidly secured to shaft 72 for rotary stepping motion therewith, through 180° intervals, as the rack 26 is raised and lowered by virtue of the sequential 180° rotation of shaft 72 by motor 80, drive belt 76 and pulley 78.

The purpose of M.S. #10 is to stop rack 26 in the raised position by de-energizing motor 80 and to activate a time delay which, after an appropriate time interval during which the tool shifting operation occurs by energization of motor 90, then closes to re-energize motor 80 and return rack 26 to the lower position.

As rack 26 returns to the lower position, cam plate 260 is rotated 180° whereupon the position of FIG. 1 is reached and cam track 258 actuates M.S. #11 to, again, de-energize motor 80. It will be recalled that actuation of M.S. #4, the safety switch, in the manner previously described is necessary before motor 80 may again be energized by M.S. #10.

The manner in which the switches #4, #10, and #11 control rack motor 80 will be more apparent from an inspection of the electrical schematic shown in FIG. 23 wherein the schematic showing of a single cam track 262 corresponds to the cam tracks 256 and 258 shown in FIG. 1. It will be noted that cam tracks 256 and 258 are formed on different radii corresponding to the positioning of each of microswitches #10 and #11 whereby each microswitch will be actuated only once during each 360° revolution of cam plate 260. Accordingly, for schematic purposes, the single cam element 262 having a single switch actuating lobe 264, as shown in FIG. 23, properly illustrates the cyclic operation of the two microswitches M.S. #10 and M.S. #11.

After completion of the desired machining operations by the tools positioned in the bearings, the cone will have translated to the left and M.S. #3, the return switch, will be actuated as previously described to return cone cam 42 to the right. As cone cam 42 shifts to the right M.S. #4, the safety switch, is moved to the "stop" position of FIG. 23 whereupon the drill placement rack motor 80 may be energized in the following manner to cooperate with drill positioning rack motor 90 to effect the tool interchange:

As M.S. #4 is actuated to the "stop" position, power lead 208 is placed in circuit with the normally closed relay switch 266 which is interlocked with normally open relay switch 268. Relay switches 266 and 268 are controlled by coils 270 and 272 which latter coil is the reset coil. Initially, current flow is through M.S. #4, normally closed relay switch 266, and M.S. #10 to vertical rack positioning motor 80. It will be noted that in the down position of the rack, which is the position of the rack when cone cam 42 is returned to the right to actuate M.S. #4, M.S. #10 is closed to the motor 80 and abutment 264 keeps M.S. #11 open. Simultaneously with the energization of motor 80 through relay switch 266 and M.S. #10, the coil 274 of relay switch 236 is energized to open the same and stop rotation of cam motor 162. Placement rack motor 80 is then driven to raise rack 26 and, concurrently, rotate cam element 262. After 180° rotation of cam element 262, which corresponds to the raised position of the rack, abutment 264 engages M.S. #10 to open the circuit to motor 80 and energize time delay coil 276 which, after a time interval during which the horizontal drill positioning motor is activated by M.S. #9, closes switch 278 to coil 270 which opens relay switch 266 and closes relay switch 268. As cam element 262 was rotated to open M.S. #10, normally closed M.S. #11 closed and, after the closing of relay switch 268, motor 80 is again driven by current supplied through relay switch 268 and M.S. #11 to return the rack to the lower position at which position abutment 264 again opens M.S. #11 and M.S. #10 again closes to motor 80. In this case, however, it will be recalled that relay switch 266 is open so that motor 80 is not again energized through closure of M.S. #10. This condition obtains until the cone starts its leftward movement at which time M.S. #4 moves to the "run" position to energize reset coil 272 and return the interlocked relay switches 266 and 268 to the position shown in FIG. 23. This leftward movement which serves to return M.S. #4 to the "run" position may be initiated in any desired manner such as by momentary depression of switch 280 which may be actuated manually. Closure of switch 280 activates solenoid air valve 234 in a direction to extend air motor piston rod 168 to shift cone 42 to the left. Since the abutment 228 holding M.S. #4 in the "stop" position translates with the cone, M.S. #4 returns to the normal "run" position as soon as the cone commences its leftward movement. Switch 280 may also be automatically closed upon the return of rack 26 to the lower position by energization of an appropriate relay, not shown, upon opening M.S. #11 as described above.

Microswitches #12 and #13 (FIG. 3) are positioned for engagement with a pair of cam tracks 282, 284 formed on the outer face of the cone shaft drive pulley driven by timing belt 164. The positioning of shorter cam track 284 corresponds to the angular position of cone flat 156 and the longer cam track 282 corresponds to the position of conical surface 154. Microswitches #12 and #13 may be brought into circuit with cone motor 162 by throwing toggle switch 286. In this event, cone motor 162 will be de-energized by engagement of the next one of microswitches *12 or *13 with either of their respective tracks 282 or 284 to stop rotation of the cone with either the flat or conical surface thereof opposed to the cam followers. Normally, toggle switch 286 is open and M.S. *12 and M.S. *13 do not affect operation of the machine.

Figure 2:
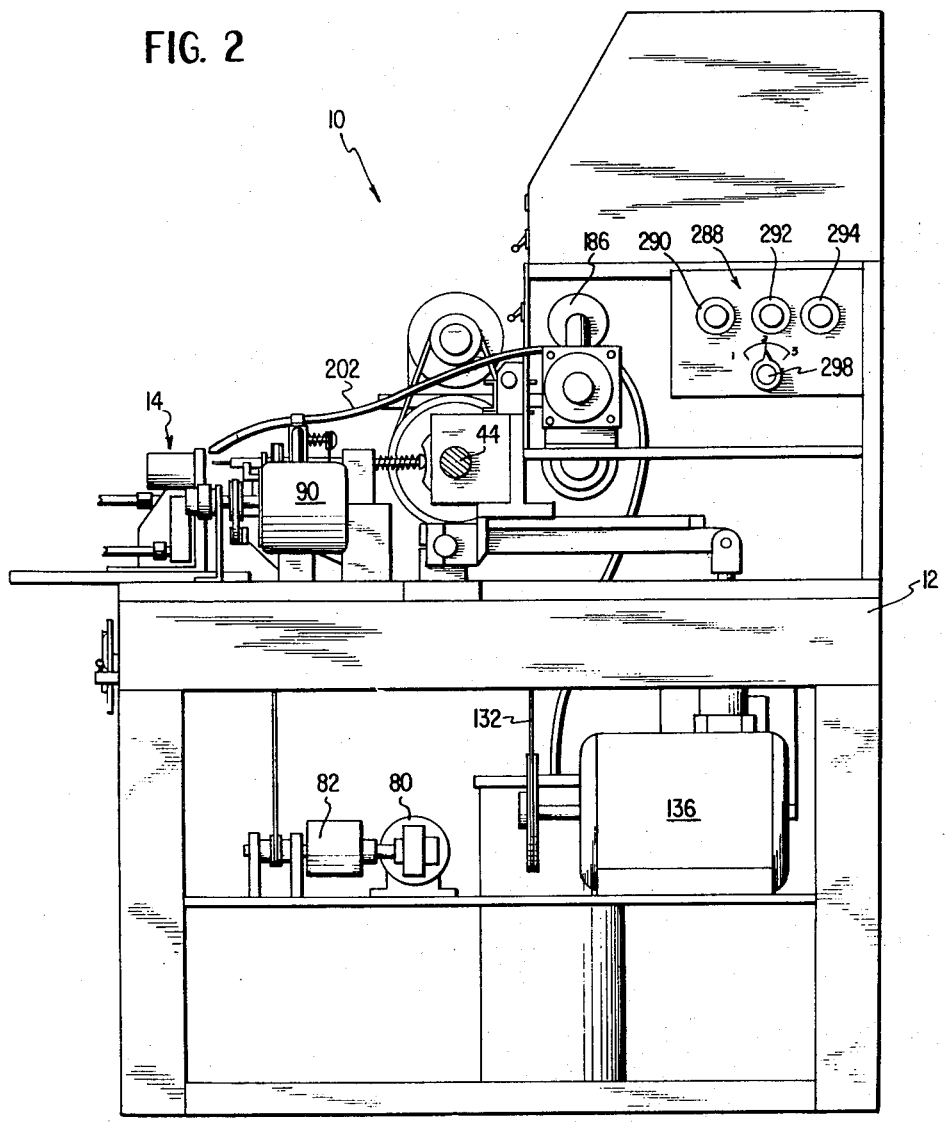
FIG. 2 is a side elevation, with parts broken away, as viewed from the right of FIG. 1.

Three bridge circuit control dials 288 (FIG. 2) control the positioning of horizontal positioning rack 28 through positioning motor 90. In initially setting up the tool changer for a machining operation; if a desired pair of tool supporting recesses 32 in rack 28, say for example those supporting the first tool to be interchanged with the Vee bearings, are not precisely vertically aligned with the bearings, then the left-most dial 290 is adjusted to unbalance the appropriate conventional bridge circuit, not shown, to bring rack 28 into appropriate alignment with the bearings. Dials 292 and 294, similarly, control the positioning of the rack to establish proper vertical alignment between the recesses supporting the second and third working tools. M.S. *9 actuates a conventional stepping switch 296 that sequentially connects each of the bridge circuits controlled by dials 288 in circuit with motor 90. The order in which the bridge circuits are brought into circuit with motor 90 is determined by a selector dial 298 having a three-position setting. When selector dial 298 is in the 1 position, the stepping switch 296 sequentially brings into circuit with motor 90 those bridge circuits controlling tools 1, 2, and 3. If selector dial 298 is set in the 2 position, as shown in FIG. 2, the order of tool operation is 1, 2, 3, - 2 - 1, 2, 3 - 2 - etc. Similarly, a setting of selector dial 298 in the 3 position brings about the following order of operation: 1, 2, 3, - 2, 3 - 1, 2, 3 - 2, 3, - etc. The order of tool operation may thus be pre-programmed merely by varying the initial setting of a conventional stepping switch by means of selector dial 298. The above referred to stepping devices 250, 296, and 362 may be those identified as "Electrical Reset Stepping Relay — Type MER — Catalogue 159–MER–115" manufactured by Guardian Electric Manufacturing Company, Chicago, Illinois.

WORK STATIONS

The details of one type work station 14 that may be used with the present invention is shown in FIGS. 17–22. The work station includes a support bracket 300 adapted to be rigidly secured to work table 12. Piston rod 302 of single acting air cylinder 304 has secured thereto an actuating fork 306 embracing arm 308 of arcuate slide 310. Slide 310 is slotted at 312 to receive machine bolts 314 that extend through the slot into an arcuate extension 316 of fixed workpiece support structure 318. Workpiece 320 is secured within a shallow circular recess, not shown, in work holder 322 by set screws or the like, not shown, for indexing rotary movement therewith. Work holder 322 is stepped at 324 and has formed integrally therewith a ratchet 326 that coacts with a pawl 328 pivotally secured to a downturned flange 330 of slide 310.

Work holder 322 is pivotally mounted between support structure 318 and bracket 300 on pin 332 carried on support structure 318. It will be seen that extension of piston rod 302 will impart a limited arcuate movement to slide 310 through fork 306. Since pawl 328 is carried by the slide, work holder 322 will be rotated clockwise, as viewed in FIG. 20, by an amount proportional to the permissible range of travel of slot 312 by the engagement of pawl 328 with ratchet 326. Upon cessation of input air pressure at line 334, a return spring retracts piston rod 302 which retraction is permitted by simultaneously venting line 334. As piston rod 302 is retracted, slide 310 returns to the position of FIG. 19 while pawl 328 ratchets freely across ratchet 326.

Work holder 322 may be selectively held against rotation about pin 332 or permitted to index thereabout in the manner previously explained by the locking mechanism 336 best shown in FIG. 21. Locking mechanism 336 includes a cylinder housing 338 having a vented spring chamber 340, piston 342, piston rod 344 and pressure chamber 346. One end of piston rod 344 is loosely received within piston 342 and is urged to the right, as viewed in FIG. 21, by spring 348 bearing against plate 350 to which the piston rod is secured. Plate 350 is loosely received in a circular recess in piston 342 for rotation relative thereto. The other end of piston rod 344 has a pair of radially extending locking lugs 352 that engage recesses 354 formed in work holder 322. Slots 356, displaced 90° from recesses 354, are provided to permit the locking mechanism to be assembled with the work holder.

In the position shown in FIG. 21, piston 342 is urged to the left by air pressure entering through line 357 to bottom locking lugs 352 firmly in recesses 356 and thus preclude movement of work holder 322 about pivot pin 322.

Upon termination of the pressure in line 357, the same is vented and spring 347 urges plate 350 and piston 342 to the right. A steel spring 358 is interposed between the cylinder housing and bracket 300. The relationship between the length of piston rod 344 and the interengaging shoulders between the cylinder housing and bracket are such that, with the piston 342 and plate 350 in the right-most position, as viewed in FIG. 21, lugs 352 are not free of recesses 354. If, in this condition, cylinder housing 338 be pushed inwardly against the bias of spring 358, the permissible clearance 360 between the interengaging portions of the cylinder and bracket allows lugs 352 to clear recesses 354 whereupon the same may be rotated 90°, by rotation of cylinder 338, to permit the cylinder and bracket to be separated to charge the workpiece.

Air lines 334 and 357 are pressurized at appropriate times during the tool changing cycle to lock and index the workpiece. Thus, while undergoing a machining operation, workpiece 320 is fixedly held in position by lugs 352 held against the bottoms of recesses 354 due to pressure in chamber 346. Chamber 346 is maintained under pressure during both working and interchanging operations for that number of tools that will engage the same area of the workpiece. In the particular embodiments illustrated in the drawings, three tools will normally engage the same area of the workpiece. Accordingly, chamber 346 is kept pressurized during the working and interchanging operations of these three tools. After the third tool has performed its prescribed working operation and horizontal slide 28 is to be moved fully to the right to position the tools for a similar sequence of operation at a new location on the workpiece, chamber 346 is vented, spring 348 urges piston rod 344 to the right (FIG. 21) to unclamp work holder 322 from bracket 300. Air cylinder 304 is then pressurized to index the work holder and workpiece whereupon cylinder chamber 346 is again pressurized to clamp the work holder for the subsequent machining operations to be performed by the three tools.

The pressurization of air cylinders 304 and 346 is controlled by microswitches # 7 and # 8. The normal position of microswitches # 7 and # 8, when the rack 26 is in the down position, is shown in FIG. 23. Each time the rack is raised, abutment 252 actuates M.S. # 7 to bring power lead 208 into circuit with a conventional stepping mechanism indicated at 362 when M.S.# 4 is in the "stop" position. Similarly, M.S. # 8, which is normally closed to the "clamp" line shown in FIG. 23, is moved into contact with the "index" line when the rack 26 is raised. Each of the "clamp" and "index" lines control solenoid air valves (not shown) in the air circuit with air cylinders 304 and 346 which, in turn, clamp and index the workpiece in the manner previously explained.

The stepper 362 may be set to provide an electrical output to a relay coil, not shown, to open normally closed relay switch 364. After any desired number of input pulses derived from closing M.S. # 7, normally open relay switch 366 in the "index" line closes and switch 364, with which switch 366 is interlocked, closes. The stepping mechanism 362 may be the same as that previously referred to as the "Electrical Reset Stepping Relay."

Assume, as in the preceding example, that three tools are to sequentially machine the same area of the workpiece. This would mean that the workpiece should be indexed to a new work position only after three tools had been interchanged with the bearings which would correspond to three upward movements of rack 26 or three input pulses applied to the stepper 362 as M.S. #7 is closed during each upward movement of the rack. Accordingly, stepper 362 is set to deliver an output pulse across the relay coil for every third input pulse derived from the closing of M.S. #7.

Assume that the workpiece has just been indexed to a new position and switches 364 and 366 are in the positions of FIG. 23; as M.S. # 7 is closed the first time, the relay coil is not actuated and switch 364 remains closed to maintain power lead 208 in circuit with the "clamp" solenoid air valve through closed switch 364. Accordingly, chamber 346 is kept pressurized to clamp the workpiece and switch 366 in the "index" line is kept open so that closing of M.S. # 8 to the "index" line does not index the workpiece. After the third input pulse, the coil controlling switches 364 and 366 is energized, switch 364 is opened and switch 366 is closed. The solenoid air valves controlled by the electrical inputs from the "index" and "clamp" lines then vent air chamber 346 and pressurize air chamber 304 to index the workpiece. De-energization of the coil controlling switches 364 and 366, as the rack moves down to open M.S. # 7 and M.S. # 8, allows these switches to reassume their normally closed and opened positions, respectively.

When it is desired to perform a plurality of machining operations in concentric circles, such as indicated in FIG. 20, the support 318 may be pivoted about pivot 368 after loosening an appropriate clamping nut 370.

SLAVE SYSTEM

An auxiliary cone cam 372 is secured to that end of cone shaft 44 remote from rotary cam driving motor 162. Auxiliary cone cam 372 is supported outside the confines of tool changer 10 and constitutes the input to a closed hydraulic slave system to be described in connection with FIG. 24. Auxiliary cam 372 may be configured similarly to cone cam 42 or, as illustrated in the drawings, the same may assume a somewhat modified conical form.

Figure 24:
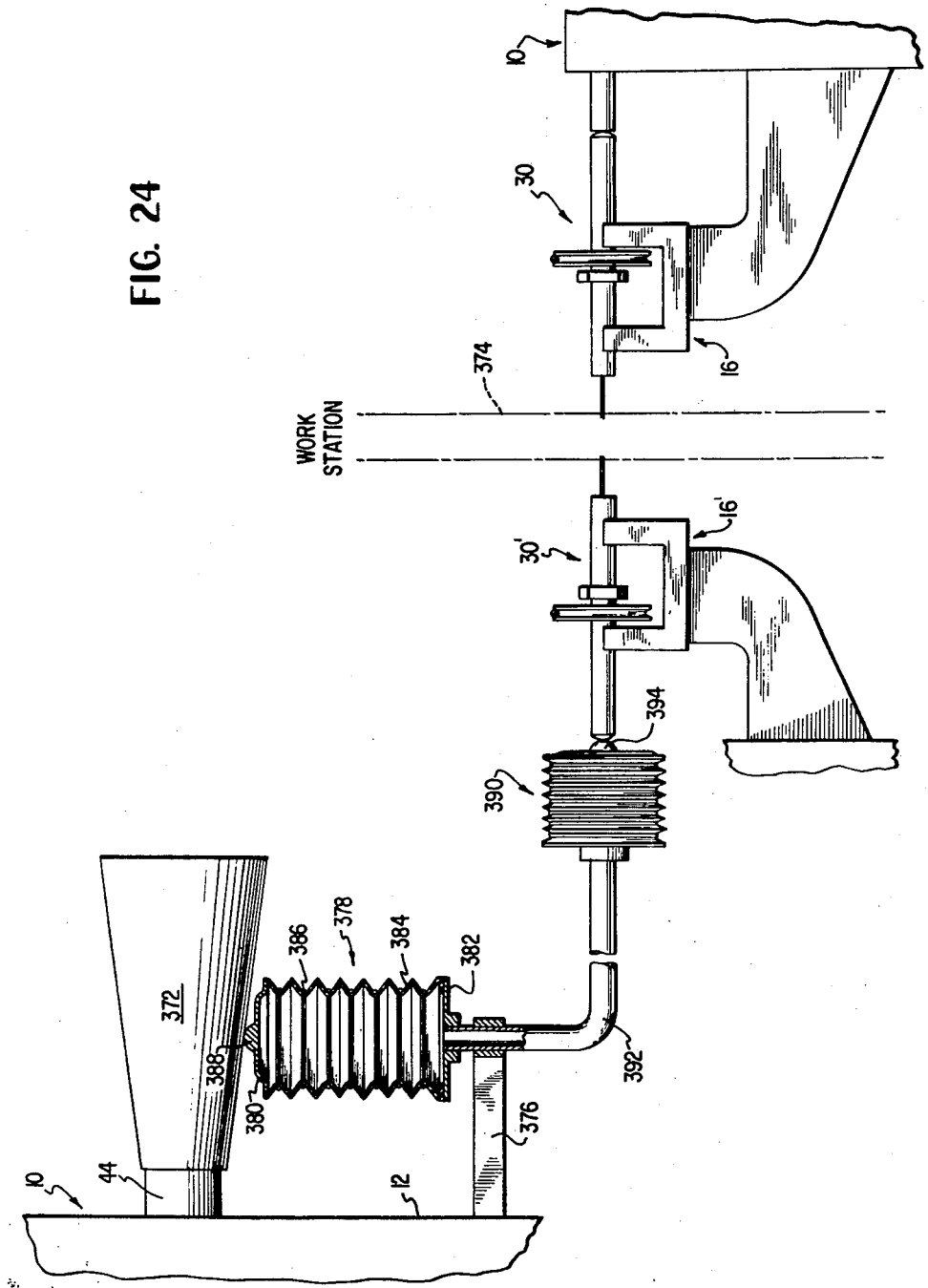
FIG. 24 is a largely diagrammatic illustration of the manner in which a hydraulic slave system may be used with the present invention.

Although the slave system, more or less diagrammatically illustrated in FIG. 24, may be used to provide the input to one or more tool changers similar to that already described; the same is herein specifically described in the form of a feedback system permitting the performance of additional machining operations on a workpiece being machined by the same tool changer 10 that supports the auxiliary cone cam.

A work station 374 is diagrammatically illustrated in FIG. 24 which is adapted to support the workpiece, not specifically illustrated, for simultaneous machining operations on opposite sides thereof.

A bracket 376, mounted on table 12, supports input bellows 378 immediately adjacent auxiliary cam 372. Bellows 378 has rigid, relatively moveable top and bottom plates 380, 382 interconnected by a flexible bellows portion 384. Although flexible portion 384 may be formed from metal, it is herein illustrated as a synthetic material whose inner convoluted folds are enveloped by a spiral wire 386 or the like to resist lateral deformation. Upper plate 380 has a cam follower protuberance 388 formed integrally therewith whereby the various infeeding motions discussed in connection with cam followers 52 may be imparted to cam follower 388 by cam 372.

Input bellows 378 is interconnected with a similar output bellows 390 by a metal tube 392 which intercommunicates the interiors of the otherwise closed bellows 378 and 390. Output bellows 390 may be mounted in any desired manner, such as by a bracket attached to tube 392, in position to engage tool 30' which is positioned on that side of the workpiece opposite to tool 30, previously described.

The bellows and intercommunicating tubing are filled with a liquid to define a closed hydraulic slave system. It will thus be apparent that the motion imparted to cam follower protuberance 388 by auxiliary cam 372 will be transmitted to the output bellows and, through protuberance 394, to the auxiliary tool 30'.

Tool 30' may be supported in Vee bearings 16' and driven by a recirculating member in the manner previously described in connection with tools 30. It is thus obvious that a single input bellows could be utilized to actuate a plurality of output bellows which would provide the infeeding mechanism for a plurality of tools in the manner provided by cone cam 42 in the preceeding description. For example, tubing 392 could be intercommunicated with four appropriately sized output bellows to infeed four tools. Alternatively, output bellows 390 could impart its output to a mechanical element such as a pivoted plate, which plate in turn would provide the input to a plurality of input bellows positioned for engagement by the pivoted plate.

Returning to the schematic showing of FIG. 24 wherein a single output bellows is illustrated, it will be apparent that rotation of cone shaft 44 will infeed tool 30 by means of cone cam 42 while tool 30' is infed by auxiliary cam 372 acting through the bellows slave system. Tools 30 and 30' may be reciprocated and/or advanced either in or out of phase, as desired, by selecting the desired angular relationship between the flats on cone cams 42 and 372.

PREFERRED MODE OF TOOL CHANGER OPERATION

Although the operation of the tool changer has been described, primarily, as semi-automatically operated; the same may be completely automated or manually controlled at each succeeding step. In the operation of the control system, previously described, toggle switch 396 is thrown to the automatic position. In the automatic position of switch 396, the actuation of the microswitches occurs as a function of the movements undergone by the various machine elements in the manner described. If switch 396 be thrown to the manual position, then the various operating elements may be individually controlled by the selective activation of manual switches 398 on the control panel. The main power switch is indicated at 400 and start and stop switches at 402, 404.

Figure 14:
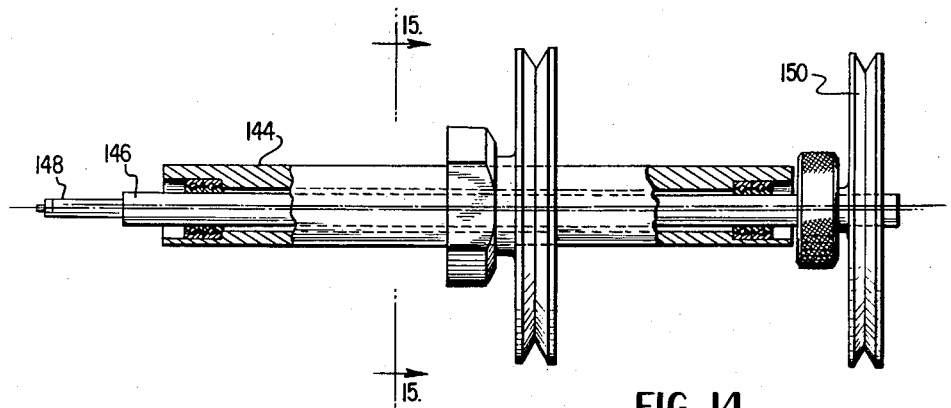
FIG. 14 is a detail view, partially in elevation and partially in section, of the compound tool shown in FIG. 13.

Front belt 34 is started in operation by activating hand switch 3 (HS * 3) prior to depressing start switch 402. If a tool of the type described in connection with FIGS. 13–15 is to be used, the back drive belt is started by closing hand switch 8 (HS * 8).

Assuming the switch 396 to be set in the automatic position which, actually, corresponds to a semi-automatic mode of operation; power switch 400 is turned on and the drills are started. The placement rack 26 is then lowered by depression of control panel switch 406 which, through circuitry not illustrated, energizes motor 80 to position rack 26 in the lower working position. "Set" button 408 on the control panel is then depressed which, through circuitry not shown, energizes air motor 194 to rock the cam forwardly. This forward movement of the cone cam results in the actuation of M.S. * 2 by arm 200 which starts rotation of cam motor 162. Start button 402 is then depressed which activates solenoid air valve 234 to start translation of the cone cam. The circuitry whereby closure of start switch 402 initiates cone translation is diagrammatically illustrated in FIG. 23 as including a separate switch 280 that may be automatically closed in any desired manner upon closure of switch 402 or, alternatively, switch 280 may be independently depressed momentarily. Immediately after cone translation begins, M.S. * 4 no longer engages its abutment and the same assumes the "run" position shown in FIG. 23. The remainder of the operation is described above in connection with the control system and work station.

As previously referred to, the tool changer may be completely automated under tape control or digital programming. Additionally, the aforementioned circuitry and power sources may, obviously, be varied as desired to afford that degree of manual or automated operation desired.

Assuming the semi-automatic operation above described, the first tools positioned on the Vee bearings and the cone translating to the left; one cycle of operation will now be described:

With cone rotation, the followers and working tools are reciprocated as the followers are, sequentially, engaged by the conical portion 154 of the cone cam and the cam flat 156. During that time interval when the followers engage cone surface 154 they are advanced further into the workpiece due to the fact that the cone is translating to the left to continually present a larger diametral surface to the followers. In those instances where chip breaker grooves 56 are provided, the tools undergo many small reciprocating movements prior to the much larger reciprocation that occurs when the followers engage flat 156. Cone translation is paused when the followers engage flat 156 due to the action of M.S. * 1 enclosing air check valve 212 when flat 156 is opposed to followers 52. The purpose of this pause is to insure that the tools will engage the workpiece at the same depth when they are again driven forwardly to avoid breakage of the tools. In certain machining operations, a longer pause in cone translation is desired which may extend for several cone revolutions for the purpose previously explained. In such case, actuation of M.S. * 5 by an appropriately positioned abutment 228 occurs at a desired point in the cone translation as selected by the threaded opening 216 in which the abutment 228 is positioned.

When the first working tool has completed its programmed machining operation in accordance with the positioning of an abutment 228 to engage M.S. * 3, a second working tool is interchanged with the first working tool.

A detailed explanation of the manner in which such interchange is accomplished was previously related in connection with the description of the control system and will not be repeated here. Suffice to say at this point that the tool working, and interchange between successive tools, is continued until the desired number of tools have completed their machining operations on one area of the workpiece after which time the workpiece may be indexed, as previously described, to present a new work area which may be machined in a similar manner.

I claim:

1. In combination with a tool changer including a movable member for withdrawing a previously used tool from a bearing and for inserting another tool therein thereby successively interchanging tools between working and non-working positions; a work holder, comprising; means for fixedly positioning a workpiece on said work holder adjacent the tool working position, means for locking said workpiece in fixed position, means for indexing said workpiece, and control means responsive to tool withdrawing movement for controlling said locking and indexing means.

2. The combination of claim 1 wherein said control means includes means maintaining said workpiece locked in fixed position through at least two tool interchanges.

3. The combination of claim 2 wherein said control means includes means for releasing said workpiece from its locked position and actuating said indexing means.

4. The combination of claim 3 wherein the tool changer further includes continuously operating means for driving said tools.

* * * * *